US011589559B2

(12) United States Patent
Crouthamel et al.

(10) Patent No.: US 11,589,559 B2
(45) Date of Patent: *Feb. 28, 2023

(54) ADAPTIVE SENSOR PERFORMANCE BASED ON RISK ASSESSMENT

(71) Applicant: Farm Jenny LLC, Mars, PA (US)

(72) Inventors: L. Robert Crouthamel, Mars, PA (US); Tammy L. Crouthamel, Mars, PA (US); Nathanial R. Drake, Pittsburgh, PA (US)

(73) Assignee: FARM JENNY LLC, Mars, PA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/138,164

(22) Filed: Dec. 30, 2020

(65) Prior Publication Data

US 2021/0112781 A1   Apr. 22, 2021

Related U.S. Application Data

(63) Continuation of application No. 16/443,404, filed on Jun. 17, 2019, now Pat. No. 10,905,105.

(Continued)

(51) Int. Cl.
*A01K 29/00* (2006.01)
*A01K 11/00* (2006.01)

(52) U.S. Cl.
CPC .......... *A01K 29/005* (2013.01); *A01K 11/004* (2013.01); *A01K 11/008* (2013.01)

(58) Field of Classification Search
CPC ... A01K 29/005; A01K 11/004; A01K 11/008
See application file for complete search history.

(56) References Cited

U.S. PATENT DOCUMENTS 6,015,390 A   1/2000 Krag
6,112,580 A   9/2000 Hesky
(Continued)

FOREIGN PATENT DOCUMENTS

CA        2806509 A1 *  3/2011  .......... A01K 11/006
WO   WO-2015143259 A1 *  9/2015  ......... A61B 10/0012
(Continued)

OTHER PUBLICATIONS

Agneessens, et al., ""On-Body Wearable Repeater as a Data Link Relay for In-Body Wireless Implants"", IEEE Antennas and Wireless Propagation Letters, vol. 11, 2012, 2012, pp. 1714-1717.
(Continued)

*Primary Examiner* — Chico A Foxx
(74) *Attorney, Agent, or Firm* — GTC Law Group PC & Affiliates

(57) ABSTRACT

Methods to conserve a sensor's power include training a model to predict a condition of an animal with a training data set, wherein the training data set comprises known outcomes associated with behavioral data and health data for a plurality of animals; sensing, with a sensor worn by a monitored animal, behavioral data and health data of the monitored animal; inputting the behavioral data and health data of the monitored animal into the model; predicting a condition of the monitored animal with the model based on the inputted behavioral data and health data; and configuring a parameter of the sensor associated with the monitored animal based on the predicted condition.

19 Claims, 18 Drawing Sheets

Related U.S. Application Data

(60) Provisional application No. 62/686,890, filed on Jun. 19, 2018.

(56) References Cited

U.S. PATENT DOCUMENTS

| | | | |
|---|---|---|---|
| 7,427,024 | B1 | 9/2008 | Gazdzinski et al. |
| 7,830,257 | B2 | 11/2010 | Hassell |
| 9,370,170 | B2 | 6/2016 | Downing et al. |
| 9,504,387 | B2 | 11/2016 | Lanza |
| 9,848,577 | B1 | 12/2017 | Brandao et al. |
| 10,075,813 | B1 | 9/2018 | Struhsaker et al. |
| 10,242,547 | B1 | 3/2019 | Struhsaker et al. |
| 10,561,365 | B2 | 2/2020 | Newman |
| 10,595,726 | B2 * | 3/2020 | Cronin ............... A61B 5/6831 |
| 10,660,546 | B2 | 5/2020 | Saigh |
| 10,905,105 | B2 | 2/2021 | Crouthamel et al. |
| 10,912,283 | B2 * | 2/2021 | Vrabete ............... G16H 40/63 |
| 2004/0141635 | A1 * | 7/2004 | Liang ............... A61B 5/1118 382/110 |
| 2004/0141636 | A1 | 7/2004 | Liang et al. |
| 2007/0279211 | A1 | 12/2007 | Fenske et al. |
| 2007/0288249 | A1 | 12/2007 | Rowe et al. |
| 2008/0147458 | A1 | 6/2008 | Yamazaki et al. |
| 2008/0218357 | A1 * | 9/2008 | March ............... A61D 17/002 340/870.11 |
| 2008/0236500 | A1 | 10/2008 | Hodges et al. |
| 2010/0030036 | A1 * | 2/2010 | Mottram ............... A61B 5/6822 119/858 |
| 2010/0156606 | A1 | 6/2010 | Gold |
| 2011/0102154 | A1 | 5/2011 | Hindhede |
| 2012/0065483 | A1 | 3/2012 | Chung |
| 2012/0225639 | A1 | 9/2012 | Gazdzinski et al. |
| 2014/0009291 | A1 | 1/2014 | Requist et al. |
| 2014/0251234 | A1 * | 9/2014 | Deutsch ............... A01K 15/021 340/573.3 |
| 2015/0282457 | A1 | 10/2015 | Yarden |
| 2016/0041022 | A1 | 2/2016 | Caplan et al. |
| 2016/0048709 | A1 | 2/2016 | Butler et al. |
| 2016/0165853 | A1 | 6/2016 | Goldfain |
| 2016/0259952 | A1 | 9/2016 | Van Rens et al. |
| 2017/0006836 | A1 | 1/2017 | Torres |
| 2017/0156288 | A1 | 6/2017 | Singh |
| 2018/0054399 | A1 | 2/2018 | Shinoda et al. |
| 2018/0070559 | A1 * | 3/2018 | So ............... G01S 19/13 |
| 2018/0160649 | A1 | 6/2018 | Hicks et al. |
| 2018/0206455 | A1 * | 7/2018 | Thiex ............... A01K 11/008 |
| 2018/0263220 | A1 * | 9/2018 | Schab ............... G08B 25/10 |
| 2018/0279582 | A1 | 10/2018 | Yajima et al. |
| 2018/0295809 | A1 | 10/2018 | Yajima et al. |
| 2018/0336518 | A1 * | 11/2018 | Kellogg ............... A01K 11/006 |
| 2018/0374165 | A1 | 12/2018 | Ferro Dos Santos |
| 2019/0008124 | A1 | 1/2019 | Komatsu et al. |
| 2019/0053470 | A1 | 2/2019 | Singh et al. |
| 2019/0059336 | A1 | 2/2019 | Robbins |
| 2019/0130728 | A1 | 5/2019 | Struhsaker et al. |
| 2019/0141959 | A1 | 5/2019 | Ingham et al. |
| 2019/0380311 | A1 | 12/2019 | Crouthamel et al. |
| 2020/0160009 | A1 | 5/2020 | Vatn |
| 2021/0022615 | A1 * | 1/2021 | Greer ............... A61B 5/7405 |

FOREIGN PATENT DOCUMENTS

| | | | | |
|---|---|---|---|---|
| WO | WO-2016151445 | A1 * | 9/2016 | ............ A61B 5/1118 |
| WO | 2019245978 | A1 | 12/2019 | |

OTHER PUBLICATIONS

Eslim, et al., ""A Cooperative Localization Scheme Using RFID Crowdsourcing and Time-Shifted Multilateration"", 2014, pp. 185-192.

Jayasuriya, et al., ""Wire is not dead" Wired-backscatter Communication for Breakage Detection in Electric Fences", International Conference on Embedded Wireless Systems and Networks (EWSN), 2017, pp. 300-304.

PCT/US2019/037504, "International Application Serial No. PCT/US2019/037504, International Search Report and Written Opinion dated Oct. 4, 2019", Farm Jenny LLC, 14 pages.

PCT/US2019/037504, "International Application Serial No. PCT/US2019/037504, Invitation to Pay Additional Fees dated Aug. 2, 2019", Farm Jenny LLC, 2 pages.

Wang, et al., "Near-Ground Path Loss Measurements and Modeling for Wireless Sensor Networks at 2.4 GHz", Hindawi Publishing Corporation International Journal of Distributed Sensor Networks vol. 2012, Article ID 969712, 10 pages doi:10.1155/2012/969712, 2012, pp. 1-10.

PCT/US2019/037504 , "International Application Serial No. PCT/US2019/037504, International Preliminary Report on Patentability dated Dec. 30, 2020", Farm Jenny LLC, 11 pages.

* cited by examiner

FIG. 2A

- VISIBLE CHARACTERISTICS 202
- ANIMAL ATTACHMENT MECHANISM 203
- PASSIVE MOUNT ID 204
- PROCESSOR 208
- PASSIVE TRANSCEIVER & ANTENNA 210
- 211
- TAG ATTACHMENT MECHANISM 212

- OBJECT ATTACHMENT MECHANISM 205
- PASSIVE OBJECT ID 207
- PROCESSOR 208
- PASSIVE TRANSCEIVER & ANTENNA 210
- 211
- TAG ATTACHMENT MECHANISM 212

126

ADAPTIVE SENSOR PERFORMANCE BASED ON RISK ASSESSMENT

CROSS-REFERENCE TO RELATED APPLICATIONS

This application is a continuation of the following U.S. patent application which is incorporated by reference in its entirety: U.S. patent application Ser. No. 16/443,404 (FJEN-0002-U01), filed Jun. 17, 2019.

U.S. Ser. No. 16/443,404 (FJEN-0002-U01) claims the benefit of priority to U.S. Provisional Patent Application 62/686,890 (FJEN-0001-P01), filed on Jun. 19, 2018, entitled "FARM ASSET TRACKING, MONITORING, AND ALERTS."

The foregoing applications are incorporated herein by reference in their entirety.

BACKGROUND

Field

System, methods, and devices for monitoring and managing livestock and other farm-related assets are disclosed.

Many of the current solutions for monitoring and managing assets on working farms, particularly small working farms have disadvantages primarily arising from the unique needs of the small farm operator. The small farm often has unique aspects requiring management, such as the monitoring of various and different types of livestock e.g. cattle, dairy cows, horses, sheep, goats, etc.) monitoring. Detection and retrieval of lost farm animals is also a concern. Another example is workflow automation and compliance workflow rules. The list of challenge goes on, but most challenges are related to the fact that small farms are highly idiosyncratic in their needs and the small farm operator is usually short on time and resources. As such, there are strong barriers for adoption of technological solutions to monitor and manage farm-related assets. Regarding a small farm's unique needs and characteristics, many small farms have transient staffing, tight profit margins, and, for many small farmers, a low tolerance for technology setup and maintenance. Some technology barriers include sparse connectivity across a farm, devices on animals can negatively impact animal comfort, safety, and productivity, devices on animals may be easily damaged or lost given potential extremes in the operating environment (temperatures, snow, precipitation, water, mud, and the like), limited GNSS (GPS) coverage inside farm buildings, limited access to AC power, and the like and non-technological barriers Thus, there is a need for robust technology solutions that address the above challenges, which are reasonably affordable to the small farmer and that are relatively easy to provision out of the box.

SUMMARY

Barriers to adoption of technology to monitor and manage livestock and farm assets may include technology barriers such as sparse connectivity across a farm; the negative impacts of placing devices on animals such as to comfort, safety, and productivity; the fact that devices on animals may be easily damaged or lost given potential extremes in the operating environment (temperatures, snow, precipitation, water, mud, and the like); limited GNSS (GPS) coverage inside farm buildings; limited access to AC power; and the like. Barriers to adoption may also include non-technological barriers such as limited working capital, transient staffing, tight profit margins, and, for many small farmers, a low tolerance for technology setup and maintenance.

In recognition of these barriers to adoption, the disclosed systems, methods and apparatus provide many features at a lower cost than the existing systems and in a way that allows a farmer to perform a self-installation and to start with a small, low cost implementation. This initial implementation may comprise software and the application of mounts and tags, which are small, low cost and easy to replace, to the farm animals. Potentially, no additional infrastructure would be required upfront. The system designed to be modular and scalable and thus may then be enlarged gradually over time if needed or modified if needed. In embodiments, in the initial installation the disclosed tags may work using a user's smartphone or other existing device capable of near field/RFID communication and cellular communication. Recently released standards for Bluetooth mesh communications together with low-cost data plans operating at low power, low data rates and long intervals facilitate the creation of an infrastructure without the need to install a power-hungry and setup/security intensive WiFi network or proprietary hubs/gateways.

The disclosed methods and systems may function when animals are on the road or at an unfamiliar location (e.g. a show, fair, race and the like).

Provisioning a sensor tag for monitoring or managing an animal may include providing a mount for the sensor tag, wherein the mount is adapted to be worn on a body part of an animal and comprises an RFID device, providing the sensor tag that is releasably connectable to the mount, exciting the RFID device, wherein the RFID device is programmed with data of an animal, and upon exciting the RFID device, such as with an application executing on a smartphone, configuring the sensor tag to be associated with the animal based on the data of the animal. Exciting may also associate the RFID device and the sensor tag with a user account. Configuring may relate to a type of sensor tag (e.g. specific to an animal species, specific to a mounting location on the animal), setting a motion sensing threshold, setting a communications interval, setting a parameter to sense, or the like. Data of the animal may be at least one of an animal type, a gender, an age, a weight, a feeding protocol, a medication protocol, a health status, an owner, or a plan of care.

In an aspect, a method may include programming a radio device affixed to an asset with an asset information, interrogating the radio device and a sensor tag releasably associated with the radio device contemporaneously to associate the radio device with the sensor tag, and configuring the sensor tag based on the asset information. Asset information may include an instruction for configuring the sensor tag. The sensor tag may include a transceiver configured to transmit sensed data to at least one of a repeater, a gateway, a smartphone, or a remote location.

In an aspect, a system for monitoring or managing livestock on a farm may include a wearable mount adapted to be worn on an animal, the wearable mount comprising a housing and an RFID device within the housing being programmable with identification data of the animal, a sensor tag releasably connectable to the wearable mount, the sensor tag comprising identification data and adapted to generate data regarding a parameter of the animal when the sensor tag is connected to the wearable mount, an application for monitoring livestock, the application being accessible with a mobile device, programmed to: monitor the animal based at least in part on the parameter of the animal, cause the mobile device to interrogate the RFID device, such as with an application executing on a smartphone, and upon interrogation of the RFID device, obtain the identification data of the animal, cause the mobile device to electronically retrieve the identification data of the sensor tag, and provision the sensor tag by associating the sensor tag with the animal based on the identification data of the sensor tag and the identification data of the animal. The mobile device may be a phone and the application may be cloud-based. The application may be in electronic communication with a data storage device, wherein the application stores data of the provisioned sensor. Provisioning may associate the RFID device and the sensor tag with a user account. Provisioning may relate to a type of RFID device (e.g. specific to an animal species, specific to a mounting location on the animal), setting a motion sensing threshold of the sensor tag, setting a communications interval of the sensor tag, setting a parameter to sense, or the like. Data of the animal may be at least one of an animal type, a gender, an age, a weight, a feeding protocol, a medication protocol, a health status, an owner, or a plan of care.

In an aspect, a system may include a radio device affixed to an asset programmed with an asset information, and an application for monitoring assets, the application being accessible with a mobile device, programmed to: cause a mobile device to interrogate the radio device and a sensor tag releasably associated with the radio device contemporaneously to associate the radio device with the sensor tag, and configure the sensor tag based on the asset information. The asset information comprises an instruction for configuring the sensor tag. The sensor tag comprises a transceiver configured to transmit sensed data to at least one of a repeater, a gateway, a smartphone, or a remote location.

In an aspect, a method of configuring a mesh network for monitoring and managing livestock, the mesh network comprising a plurality of radio nodes, wherein at least one of the plurality of radio nodes is attached to an animal, the method including providing a user interface having a graphical display displaying a visual depiction of a geographical area (e.g. a farm), wherein the visual depiction is a map comprising topographic features (e.g., landforms and terrain, buildings, roads, fences, walls and other manmade features, vegetation) of the geographical area; for each radio node of the plurality of radio nodes, identifying a potential placement site on the map; evaluating a performance of the mesh network by predicting the performance of the mesh network, the mesh network having the potential placement site for each radio node, based at least on the topographic features and data regarding the animal; utilizing the predicted performance to generate a recommended placement site for each radio node of the plurality of radio nodes; and displaying on the graphical display the recommended placement site for each radio node of the plurality of radio nodes on the map. Via the graphical display, the method may include altering a topographic feature (e.g. an addition of a manmade object to the map) in the visual depiction and re-evaluating the performance of the mesh network based on the alteration. Evaluating the performance of the mesh network may be by predicting the performance of the mesh network having the potential placement site for each radio node based at least on the topographic features and data regarding the animal further comprises accessing a data store comprising interference profiles for topographic features or animals. The interference profiles of animals may include a roaming behavior, a mass, and a herding behavior. The manmade object may be one of a fence line, a feeder, a trough, a waterer, a farmhouse, a pole, a barn, a corral, a pasture, a shed, a shelter, or a henhouse. The plurality of radio nodes may include at least one of a repeater, a gateway, a sensor tag, a sensor, or a beacon. The potential placement site for each radio node may include one or more of a fence line, a feeder, a trough, a waterer, a farmhouse, a pole, a barn, a corral, a pasture, a shed, a shelter, or a henhouse. Identifying the potential placement site for each radio node in the map involves identifying a potential signal obstruction on the map. Generating involves a manual input from a user of features of the geographical area. The method may further include, via the graphical display, altering the potential placement site of at least one of the plurality of radio nodes and re-evaluating the performance of the mesh network to determine a resilience of the mesh network to the alteration, wherein altering the potential placement site of the at least one of the plurality of radio nodes comprises altering a portion of the plurality of radio nodes that are attached to animals. Altering the portion of the plurality of radio nodes that are attached to animals includes one of altering a number of animals or altering a geographic location of the animals. The sensor tag may be attached to an animal. The sensor may generate data indicative of a movement of the animal or a physiological parameter of the animal.

In an aspect, a system for monitoring and managing livestock may include a mesh network of a plurality of radio nodes, wherein at least one of the plurality of radio nodes is attached to an animal, a user interface having a graphical display displaying a visual depiction of a geographical area (e.g. a farm), wherein the visual depiction is a map comprising topographic features of the geographical area; a map manager that identifies a potential placement site on the map for each radio node of the plurality of radio nodes; and a prediction facility that predicts a performance of the mesh network having the potential placement site for each radio node based at least on the topographic features and data regarding the animal, and generates a recommended placement site for each radio node of the plurality of radio nodes based on the predicted performance, wherein the recommended placement site for each radio node of the plurality of radio nodes on the map is displayed on the graphical display. The user interface may receive, from one or more input devices, an input comprising alteration of a topographic feature in the visual depiction, wherein the prediction facility re-evaluates the performance of the mesh network based on the alteration. The alteration may include an addition of a manmade object to the map. The system may further include a data store comprising interference profiles for topographic features or animals that is accessed by the prediction facility in predicting the performance. The interference profiles of animals may include a roaming behavior, a mass, and a herding behavior. The manmade object may be one of a fence line, a feeder, a trough, a waterer, a farmhouse, a pole, a barn, a corral, a pasture, a shed, a shelter, or a henhouse. The plurality of radio nodes may include at least one of a repeater, a gateway, sensor, a sensor tag, or a beacon. The potential placement site for each radio node includes one or more of a fence line, a feeder, a trough, a waterer, a farmhouse, a pole, a barn, a corral, a pasture, a shed, a shelter, or a henhouse. The map manager may further identify a potential signal obstruction on the map. The user interface may receive, from one or more input devices, one or more features of the geographical area, or an input comprising alteration of the potential placement site of at least one of the plurality of radio nodes, wherein the prediction facility re-evaluates the performance of the mesh network to determine a resilience of the mesh network to the alteration. The alteration may be of a portion of the plurality of radio nodes that are attached to animals, such as by altering a number of animals or altering a geographic location of the animals. The sensor tag, attached to an animal, may generate data indicative of a movement of the animal or a physiological parameter of the animal.

In an aspect, a method for provisioning a working farm with a monitoring system may include providing a plurality of radio nodes to be used in a mesh network; providing an electronic interface through which a user inputs data regarding one or more topographical features of the working farm and animals on the working farm; with a computer processor, accessing an electronic data store of obstruction profiles of the one or more topographical features and obstruction profiles of the animals on the working farm; with a computer processor, predicting a performance of the mesh network based on the obstruction profiles of the one or more topographical features and the obstruction profiles of the animals; generating a recommendation for placement of the plurality of radio nodes; and causing the electronic interface to output the recommendation for placement. The obstruction profiles of the animals may include roaming behavior, mass, or herding behavior. The step of generating the recommendation for placement of the plurality of radio nodes includes a recommendation of placement on an animal. The recommendation of placement on the animal may include a recommendation of a body part of the animal on which to place the plurality of radio nodes. The sensor tag may be attached to an animal and generates data indicative of a movement of the animal or a physiological parameter of the animal. The plurality of radio nodes may include at least one of a sensor, sensor tag, repeater, a gateway, a tag, or a beacon. The recommendation for placement for each radio node of the plurality of radio nodes comprises one or more of a fence line, a feeder, a trough, a waterer, a farmhouse, a pole, a barn, a corral, a pasture, a shed, a shelter, or a henhouse. The method may further include, via the electronic interface, altering the recommendation for placement of at least one of the plurality of radio nodes and re-evaluating the performance of the mesh network to determine a resilience of the mesh network to the alteration.

In an aspect, a system for provisioning a working farm with a monitoring system may include a plurality of radio nodes to be used in a mesh network; an electronic interface through which a user inputs data regarding one or more topographical features of the working farm and animals on the working farm; a computer processor that accesses an electronic data store of interference profiles of the one or more topographical features and obstruction profiles of the animals on the working farm; a computer processor that predicts a performance of the mesh network based on the obstruction profiles of the one or more topographical features and the interference profiles of the animals; and a recommendation engine that generates a recommendation for placement of the plurality of radio nodes, wherein the electronic interface outputs the recommendation for placement. The obstruction profiles of the animals may include roaming behavior, mass, or herding behavior. The recommendation for placement of the plurality of radio nodes may include a recommendation of placement on an animal. The recommendation of placement on the animal may include a recommendation of a body part of the animal on which to place the plurality of radio nodes. The sensor tag may be attached to an animal and may generate data indicative of a movement of the animal or a physiological parameter of the animal. The plurality of radio nodes may include at least one of a repeater, a gateway, a tag, a sensor, or a beacon. The recommendation for placement for each radio node of the plurality of radio nodes may include one or more of a fence line, a feeder, a trough, a waterer, a farmhouse, a pole, a barn, a corral, a pasture, a shed, a shelter, or a henhouse. The user may input, through the electronic interface, an alteration to the recommendation for placement of at least one of the plurality of radio nodes, and wherein based on the alteration, the computer processor re-evaluates the performance of the mesh network to determine a resilience of the mesh network to the alteration.

In an aspect, a computer-implemented method to create a layout for a plurality of radio nodes in a mesh network to manage or monitor livestock on a farm having topographic features and animals may include obtaining feedback data for a plurality of radio nodes placed in selected geographical areas, wherein the feedback data relates to a performance indication of the plurality of radio nodes, wherein performance is at least partially determined by assessing an effect the topographic features in the selected geographical areas and the animals have on performance; utilizing the feedback data to select a training data set for a model for placing radio nodes in a geographical area, wherein the training data set comprises aspects of a plurality of placements of the plurality of radio nodes that yielded performance measures that exceed a threshold; training the model with the training data set, wherein the training data set comprises information about radio node placements, an obstruction profile of the animals or topographical features, and data on a mesh network performance; proposing a placement of a new plurality of radio nodes to form a new mesh network in a new geographical area by identifying one or more potential placement sites in a topographical map of the geographical area; and using the model, estimating a performance of the new mesh network and outputting the estimated performance on the topographical map. The step of proposing the placement of the new plurality of radio nodes to form the new mesh network in the new geographical area by identifying one or more potential placement sites in the topographical map of the geographical area further includes proposing a placement of at least one node on at least one of the animals. The feedback data may further be utilized to select a testing data set for the model, and testing the model with the testing data set. The method may further include altering at least one of the one or more potential placement sites of at least one of the new plurality of radio nodes and re-estimating the performance of the new mesh network to determine a resilience of the mesh network to the alteration, such as by altering a portion of the new plurality of radio nodes that are attached to animals (e.g. by altering a number of animals or altering a geographic location of the animals).

In an aspect, a method of operating a power-efficient ad-hoc mesh network may include positioning at least two wireless transceivers near an electric fence, wherein the electric fence is energized in accordance with a pulsed discharge interval; detecting a pulsed discharge the at least two wireless transceivers; and synchronizing a shared transmission timing window of the at least two wireless transceivers with the detected pulse discharge, wherein when a timing is not inside the shared transmission timing window, at least one of the at least two wireless transceivers enters a low power mode wherein transmitting or receiving is not possible. Detecting a pulsed discharge may include detecting a change in an electro-magnetic field near the electric fence. The method may further include triggering an alert when at least one of the at least two wireless transceivers: detects a lack of fence discharges, discontinues synchronized transmissions, or transmits continuously. An alert may indicate one of a break in a fence or a fence outage. When the alert is triggered, the method identifies an asset last located near the at least two wireless transceivers. The method may further include increasing a tracking interval of the asset during a time that the at least two wireless transceivers at least one of detects a lack of fence discharges or discontinues synchronized transmissions or transmits continuously. A non-contact means of detecting pulsed discharges from an electro-magnetic field produced by the pulsed discharge may result in the at least two wireless transceivers waking up. The at least two wireless transceivers may be powered by energy harvested from the electric fence. The at least two wireless transceivers may be configured to transmit and receive during a respective communications timing window of two different electric fences, with potentially different discharge intervals, bridging communications between these two networks. In embodiments, at least one of the two wireless transceivers may operate during the timing windows of both the first and second fence. This wireless transceiver might then bridge communications to a third transceiver operating only on the second fence.

In an aspect, a system for monitoring or managing livestock on a farm may include a wearable sensor adapted to generate data regarding a parameter of an animal when the wearable sensor is worn by the animal at a sensing interval; a processor in electronic communication with the wearable sensor that receives the data regarding the parameter of the animal at a communication interval, the processor programmed to: assess a health risk for the animal based on data generated by the wearable sensor, and generate instructions to modify at least one of the sensing interval of the wearable sensor or the communication interval based on the health risk. The communication interval may be an interval at which the wearable sensor transmits the data regarding the parameter of the animal or the processor receives the data regarding the parameter of the animal. The system may further include a mobile device at least one of comprising or in electronic communication with the processor, wherein the mobile device is in electronic communication with the wearable sensor. The mobile device may transmit the instructions to the wearable sensor. The wearable sensor may modify the sensing interval based on the instructions. The sensing interval may be increased, and the processor may be further programmed to generate instructions to determine if the health risk has decreased and to generate and transmit instructions to the wearable sensor to decrease the sensing interval if the health risk has decreased. The sensing interval may be decreased, and the processor may be further programmed to generate instructions to determine if the health risk has increased and to generate and transmit instructions to the wearable sensor to increase the sensing interval if the health risk has increased. The wearable sensor may be releasably attached to a mount permanently affixed to the animal, and may generate data indicative of at least one of a movement, a physiological parameter of the animal, or a behavior of the animal. The wearable sensor may generate data indicative of an animal body function comprising at least one of a urination, a respiration, a lactation, a bowel movement, a body measurement, a calving activity, or a passing gas. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device.

In an aspect, a method for monitoring livestock on a farm may include providing a wearable sensor to be worn on an animal; generating data of a parameter of the animal when the wearable sensor is worn by the animal at a sensing interval; electronically transmitting the data of the parameter of the animal at a communication interval to a server; with the server, determining a health risk of the animal based on the data of the parameter of the animal; with the server, generating instructions to modify at least one of the sensing interval or the communication interval based on the health risk; and modifying at least one of the communication interval or the sensing interval by transmitting the instructions to the wearable sensor. The instructions to modify at least one of the sensing interval of the wearable sensor or the communication interval based on the health risk may include instructions to increase or decrease at least one of the sensing interval of the wearable sensor or the receiving interval. The wearable sensor may be releasably attached to a mount permanently affixed to the animal, and may generate data indicative of a movement of the animal, a physiological parameter of the animal, an animal body function comprising at least one of a urination, a respiration, a lactation, a bowel movement, a body measurement, a calving activity, or a passing gas, or a behavior of the animal. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device.

In an aspect, a computer-implemented method to conserve a wearable sensor's power may include training a model with a training data set for predicting a condition of an animal, wherein the training data set comprises known outcomes associated with behavioral data and health data for a plurality of animals; training the model with the training data set to obtain a trained model; predicting a condition of an animal by inputting current behavioral data and current health data to the trained model; and tailoring a parameter of a wearable sensor for an animal based on the predicted condition. The parameter may be a sensitivity of the wearable sensor, a measurement interval of the wearable sensor, a communications power or a communications interval. The parameter may be further tailored based on at least one of: a predicted wearable sensor battery life, a mesh network performance or received signal strength of the wearable sensor, proximity of the animal to a point of interest or proximity to a suspected break in containment, a desire to activate an actuator in proximity to the animal wearing the wearable sensor.

In an aspect, a system for monitoring or managing livestock on a farm may include a plurality of wearable sensors in a mesh network, each of the plurality of wearable sensors in the plurality of wearable sensors adapted to generate data regarding location and at least one of a positional parameter or a behavioral parameter of an animal wearing one of the plurality of wearable sensors; a processor in electronic communication with a first wearable sensor of the plurality of wearable sensors worn by a first animal and a second wearable sensor of the plurality of wearable sensors worn by a second animal, the processor programmed to: determine a transmission impairment of the first wearable sensor based on at least one of the positional parameter or the behavioral parameter of the second animal, and generate instructions to modify a transmission characteristic of the mesh network based on the transmission impairment, communicate the instructions to at least one other wearable sensor of the plurality of wearable sensors, and modify the transmission characteristic of at least one other wearable sensor of the plurality of wearable sensors based on the instructions. The instructions to modify the transmission characteristic may include modifying a transmission rate or a power of a signal transmitted by at least one of the wearable sensors of the plurality of wearable sensors. The behavioral parameter may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The positional parameter may relate to at least one of a head position, a body position, a body elevation, a body orientation, a movement, or a stance.

In an aspect, a computer-implemented method may include providing a first electronic sensor to be worn by a first animal that generates data of a physiological or a behavioral parameter of the first animal when worn by the first animal; providing a second electronic sensor to be worn by a second animal that generates data of a physiological parameter or a behavioral parameter of the second animal when worn by the second animal; determining a proximity of a first electronic sensor to the second electronic sensor if the second electronic sensor is associated with a location information; and establishing a membership of the first animal in a herd based on the determined proximity and at least one of (i) the data of the physiological parameter of the first animal, (ii) the data of the behavioral parameter of the first animal, (iii) the data of the physiological parameter of the second animal, or (iv) the data of the behavioral parameter of the second animal. The behavioral parameter may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The physiological parameter may relate to an animal body function comprising at least one of a urination, a respiration, a lactation, a bowel movement, a body measurement, a calving activity, or a passing gas.

In an aspect, a method for determining a location of a radio device worn by an animal may include identifying currently available methods for determining the location of the radio device, wherein the currently available methods comprise at least one of: determining a proximity to a smartphone with a known location, determining a proximity to a fixed location beacon, determining a proximity to another radio device which has a high confidence in its own location, or triangulating (angles) or multilaterating (ranges) from a set of at least three location anchors at known locations, wherein the radio device selects which of the currently available methods should be used and at what update rate based on one or more factors. The one or more factors may include a time since the radio device was last located, a confidence in the location of the radio device, a current condition of the animal bearing the radio device, urgency to activate an actuator in proximity to the animal, or a time of day. Identifying the currently available methods may include identifying the smartphone within range, identifying the set of at least three location anchors within range, identifying another radio device or identifying a fixed location beacon within range. Determining a proximity to a fixed location beacon may include listening for one or more fixed location beacons; recording a signal strength or angle to each fixed location beacon detected; and forwarding the recorded signal strength for each fixed location beacon to a remote computer for processing, wherein the remote computer maintains a physical location of the one or more fixed location beacons. If the radio device detects the fixed location beacon at a signal strength that exceeds a threshold, triangulating/multilaterating may not be additionally selected for determining the location of the radio device. If the radio device does not detect any fixed location beacons, the location of the radio device may be determined using a location of the smartphone in proximity. The method may further include calculating a confidence circle based on a signal strength between the radio device and the smartphone. When the location of the radio device is outside of a boundary, the radio device may be triggered to at least one of expend additional energy in subsequent location attempts, reduce a location update interval, or activate an emergency locating system.

In an aspect, a method may include determining a proximity of a first radio device associated with a first asset to a second radio device associated with a second asset which has a high confidence in its own location; estimating, based on the proximity, location of the second radio device, and a partial location estimate for the first radio device using two or more fixed location anchors, that the second asset is obstructing a signal between the first radio device and a third location beacon; and multilaterating a location of the first radio device from a set of at least two location anchors at known locations and a signal strength to the second radio device, thereby ignoring the signal strength of the obstructed third location beacon. The first and second radio devices may be a sensor tag worn by an animal. The third location beacon may be located on one of a fence line, a feeder, a trough, a waterer, a farmhouse, a pole, a barn, a corral, a pasture, a shed, a shelter, or a henhouse.

In an aspect, a method may include determining a proximity of a first radio device associated with a first asset to a second radio device associated with a second asset which has a high confidence in its own location; estimating, based on the proximity and a location of the second radio device and a partial location estimate for the first radio device, using two or more fixed location beacons, that the second asset is obstructing a signal between the first radio device and a fixed location beacon; and refining a multilateration of a location of the first radio device by substituting a series of corrected signal strengths for the obstructed fixed location beacon, and identifying the location of the first radio device by a strong correlation between the refined estimated location and the proximity of the second radio device. The first and second radio device may be a sensor tag worn by an animal. The series of corrected signal strengths may take into account a posture or an orientation of the first asset, wherein the first asset is a first farm animal and the second asset is a second farm animal. The series of corrected signal strengths may take into account a posture or an orientation of the second asset with respect to a path to the fixed location beacon that it is obstructing. A perpendicular orientation of the second asset relative to the fixed location beacon may require a more significant correction than a parallel or an oblique orientation. The fixed location beacon may be located on one of a fence line, a feeder, a trough, a waterer, a farmhouse, a pole, a barn, a corral, a pasture, a shed, a shelter, or a henhouse.

In an aspect, a method for estimating a location of a radio device, may include determining a set of characteristics of the radio device: a proximity to a smartphone with a known location, a proximity to a fixed location beacon, a proximity to another radio device which has a high confidence in its own location, and a triangulation/multilateration from a set of at least three location anchors at known locations; determining a relative confidence of one or more estimated locations based on at least one of set of characteristics; and graphically depicting a range of possible locations of the radio device to a user based on the one or more estimated locations and the relative confidence. When the location of the radio device is outside of a boundary, the radio device may be triggered to at least one of expend additional energy in subsequent determining the set of characteristics, reduce a location update interval, or activate an emergency locating system. The radio device is a sensor tag worn by an animal. The fixed location beacon may be located on one of a fence line, a feeder, a trough, a waterer, a farmhouse, a pole, a barn, a corral, a pasture, a shed, a shelter, or a henhouse.

In an aspect, a method for estimating a location of a radio device may include determining a set of characteristics of the radio device, comprising: a proximity to a smartphone with a known location, a proximity to a fixed location beacon, a proximity to another radio device which has a high confidence in its own location, and a triangulation/multilateration from a set of at least three location anchors at known locations; determining a relative confidence of one or more estimated locations based on at least one of the set of characteristics; and adjusting, based on the relative confidence, an energy expended in determining the set of characteristics. When the one or more estimated locations are outside of a boundary, the radio device may be triggered to at least one of reduce a location update interval or activate an emergency locating system. The radio device is a sensor tag worn by an animal. The fixed location beacon may be located on one of a fence line, a feeder, a trough, a waterer, a farmhouse, a pole, a barn, a corral, a pasture, a shed, a shelter, or a henhouse.

In an aspect, a method may include sensing a position of a portion of an animal using a sensor tag associated with a radio device; predicting if a signal from the radio device is obstructed based on the position; and augmenting the signal if the signal is predicted to be obstructed. Augmenting the signal may include increasing a communication power of the sensor tag. The signal may be obstructed if the position indicates that an animal's head is close to a ground. The signal augmentation may be determined based on the position of the animal's head. The sensor tag may be one or more of an inclinometer, magnetometer, an accelerometer, gyroscope, a barometer or a GPS. The position may relate to at least one of a head position, a body position, a body orientation, a body elevation, a movement, or a stance.

In an aspect, a computer-implemented method to map signal obstructions of a mesh network to monitor and manage animals in a geographical area on a farm may include determining a location for a plurality of radio nodes affixed to animals in a geographical area; identifying when a signal from one of the plurality of radio nodes is obstructed and correlating an obstruction with the location of the one of the plurality of radio nodes; and updating a graphical representation of the mesh network with a representation of the obstruction. The step of identifying when the signal from one of the plurality of radio nodes is obstructed may be done by determining at least one of a behavioral characteristic or a positional characteristic of at least one of the animals on the farm. The behavioral characteristic may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The positional characteristic may relate to at least one of a head position, a body position, a body elevation, a movement, or a stance. The graphical representation may be a topographical map of the geographical area. Determining the location may be by at least one of determining a proximity to a smartphone with a known location, determining a proximity to a fixed location beacon, determining a proximity to another radio device which has a high confidence in its own location, or triangulating from a set of at least three location anchors at known locations.

In an aspect, a system for estimating a location of a radio device may include a plurality of mobile devices, each with a known location and capable of detecting a radio device; a remote server for aggregating data from the plurality of mobile devices, wherein when one of the plurality of mobile devices detects the radio device, a detection record is generated and transmitted to the remote server; and a graphical display of a user application that depicts an estimated location of the radio device based on the detection record. The detection record may include at least one of a time, an identifier, and a location. The plurality of mobile devices may be associated with different user accounts. The radio device may be associated with a user account. Any mobile device of the plurality of mobile devices may detect the radio device regardless of whether the mobile device is associated with the user account that is associated with the radio device.

In an aspect, a system for estimating a location of a radio device may include a plurality of a wearable sensors adapted to be worn by an animal and capable of detecting a presence of one or more mobile devices; wherein when one of the plurality of wearable sensors detects a mobile device of the one or more mobile devices, a detection record is generated and transmitted to a remote server; the remote server for aggregating data from the plurality of wearable sensors regarding the detected mobile devices; and a graphical display of a user application that depicts an estimated location of the one of the plurality of wearable sensors based on the detection record. The detection record may include at least one of a time, an identifier, and a location. The plurality of wearable sensors may be associated with different user accounts. The mobile device may be associated with a user account. Any wearable sensor of the plurality of wearable sensors may detect the mobile device regardless of whether the wearable sensor is associated with the user account that is associated with the mobile device.

In an aspect, a method to determine workflow events on a farm may include obtaining sensor data from one or more animals, wherein the sensor data relate to a behavior or a location of the one or more animals; and inferring a workflow event based on the sensor data. The method may further include logging the workflow event in a compliance log. When the sensor data indicate that the location of the one or more animals is in a field, an inferred workflow event may be that a gate was opened. When the sensor data indicate that the one or more animals are congregating near other animals and the one or more animals have their heads down, an inferred workflow event may be that the one or more animals were fed. When the sensor data indicate that the one or more animals are near a feed pan containing a beacon, an inferred workflow event may be that a correct food or medication was delivered to the one or more animals.

In an aspect, a method may include obtaining sensor data from one or more animals, wherein the sensor data relate to a behavior or a location of the one or more animals; and triggering a workflow event based on the sensor data. When the sensor data indicate a specific condition of the one or more animals and a location of the one or more animals near a feeding/watering location, the workflow event triggered may be a delivery of specific food or medication, or a delivery of water. When the specific condition is that the one or more animals are not drinking, the specific food delivered may be a small portion of desirable feed dusted with salt and/or electrolytes to promote thirst and encourage drinking.

In an aspect, a computer-implemented method of determining compliance with workflow rules on a farm may include for each of a plurality of animals on the farm, providing a wearable sensor configured to sense a parameter of an animal wearing the wearable sensor; receiving, at a processor, the parameters for the plurality of animals; with the processor, determining at least one of a location, a behavior, or a position of the plurality of animals based on the parameters; and determining compliance with a workflow rule based on at least one of the location, the behavior, or the position of the plurality of animals. The behavior may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The position may be at least one of a head position, a body position, a body elevation, a movement, or a stance. The location may be a fence line, a feeder, a trough, a waterer, a farmhouse, a pole, a barn, a corral, a pasture, a shed, a shelter, or a henhouse. The workflow rule may relate to at least one of a stabling, a pasturing, a herding, a sheltering, a feeding, a medicating, a provision of water, a manure and/or wastewater removal, an inspection interval, a records management, or a feed storage. A user may input or update the workflow rule.

In an aspect, a method may include obtaining sensor data from one or more animals, wherein the sensor data relate to a behavior or a location of the one or more animals; and triggering a workflow event based on the sensor data. When the sensor data indicate a specific condition of the one or more animals and a location of the one or more animals near a feeding/watering location, the workflow event triggered may be a delivery of specific food or medication, or a delivery of water. The workflow event may relate to at least one of a stabling, a pasturing, a herding, a sheltering, a feeding, a medicating, a provision of water, a manure and/or wastewater removal, an inspection interval, a records management, or a feed storage. A user may input or update the workflow rule.

In an aspect, a system for determining compliance with workflow rules on a farm may include a plurality of wearable sensors, each to be worn by a corresponding animal, each wearable sensor of the plurality of wearable sensors generating data of at least one of a behavior, a location, or a physiology of the corresponding animal wearing the wearable sensor; a data storage configured to store workflow rules for the farm; a processor in communication with the data storage and the plurality of wearable sensors, the processor programmed to: aggregate the data of the at least one of the behavior, the location, or the physiology of a plurality of corresponding animals to determine a characteristic of the plurality of corresponding animals, and determine a compliance with a workflow rule based on the characteristic of the plurality of corresponding animals. The behavior may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The location may be a fence line, a feeder, a trough, a waterer, a farmhouse, a pole, a barn, a corral, a pasture, a shed, a shelter, or a henhouse. The workflow rule may relate to at least one of a stabling, a pasturing, a herding, a sheltering, a feeding, a medicating, a provision of water, a manure and/or wastewater removal, an inspection interval, a records management, or a feed storage. The plurality of wearable sensors may generate data regarding a position of the plurality of corresponding animals. The position may be at least one of a head position, a body position, a body elevation, a movement, or a stance. The system may further include a user interface for at least one of inputting or modifying the workflow rule.

In an aspect, a system for triggering a workflow event on a farm may include a plurality of wearable sensors, each to be worn by a corresponding animal, each wearable sensor of the plurality of wearable sensors generating data of at least one of a behavior, a location, or a physiology of the corresponding animal wearing the wearable sensor; a processor in communication with a data storage and the plurality of wearable sensors, the processor programmed to: aggregate the data of the at least one of the behavior, the location, or the physiology of a plurality of corresponding animals to determine a characteristic of the plurality of corresponding animals, and trigger a workflow event based on the characteristic of the plurality of corresponding animals. The behavior may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The location may be a fence line, a feeder, a trough, a waterer, a farmhouse, a pole, a barn, a corral, a pasture, a shed, a shelter, or a henhouse. The workflow event may relate to at least one of a stabling, a pasturing, a herding, a sheltering, a feeding, a medicating, a provision of water, a manure and/or wastewater removal, an inspection interval, a records management, or a feed storage. The plurality of wearable sensors may generate data regarding a position of the plurality of corresponding animals. The position may be at least one of a head position, a body position, a body elevation, a movement, or a stance. The system may further include a user interface for at least one of inputting or modifying the workflow event.

In an aspect, a system for relaying an implantable sensor data may include an implantable sensor comprising a wireless communication facility enabled to collect biological data related to an animal; and an external wearable device that communicates wirelessly with the implantable sensor when the implantable sensor is implanted in the animal, the external wearable device receiving the biological data and relaying it to a remote location, wherein the external wearable device provides non-contact power to the implantable sensor. The wireless communication facility may utilize near field communication. The implantable sensor may be one of implanted, inserted or ingested. The external wearable device may be a sensor tag associated with the animal or a different animal. The external wearable device may relay a configuration information from the remote location to the implantable sensor. The system of claim may further include a processor at the remote location in electronic communication with the external wearable device that receives the biological data, the processor programmed to: (i) assess a health risk for the animal based on biological data generated by the implantable sensor, and (ii) generate instructions to modify at least one of a sensing interval of the implantable sensor, a communication interval of the implantable sensor to the external wearable device, or a relay interval of the external wearable device to the remote location based on the health risk.

In an aspect, a method for relaying an implantable sensor data may include collecting biological data related to an animal from an implantable sensor comprising a wireless communication facility; and relaying the biological data to a remote location with an external wearable device that communicates wirelessly with the implantable sensor when the implantable sensor is implanted in the animal, wherein the external wearable device provides non-contact power to the implantable sensor. The wireless communication facility may utilize near field communication. The implantable sensor may be one of implanted, inserted or ingested. The external wearable device may be a sensor tag associated with the animal or a different animal. The external wearable device may relay a configuration information from the remote location to the implantable sensor. The method may further include assessing a health risk for the animal based on the biological data generated by the implantable sensor, and generating instructions to modify at least one of a sensing interval of the implantable sensor, a communication interval of the implantable sensor to the external wearable device, or a relay interval of the external wearable device to the remote location based on the health risk.

In an aspect, a system to determine whether a farm animal is distressed may include a first sensor tag generating physiological data or behavioral data about a first farm animal, wherein the first farm animal is in a herd; a second sensor tag generating physiological data or behavioral data about a second farm animal contemporaneous with the physiological data or behavioral data about the first farm animal; a processor in electronic communication with the first sensor tag and the second sensor tag, the processor programmed to determine whether the first farm animal is distressed based on the physiological data about the first farm animal, the behavioral data of the first farm animal, the physiological data about the second farm animal, and the behavioral data of the second farm animal. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The physiological data may be obtained by non-invasive detection of an animal body function. The animal body function may be at least one of a urination, a respiration, a lactation, a bowel movement, a body measurement, a calving activity, or a passing gas. The processor may be in further electronic communication with an environmental sensor to collect environmental data, and wherein the processor is programmed to determine whether the first farm animal is distressed based on the physiological data about the first farm animal, the behavioral data of the first farm animal, the physiological data about the second farm animal, the behavioral data of the second farm animal, and the environmental data. The environmental data may include at least one of a temperature, a humidity, a precipitation, a pollen count, an air quality, a weather event, a season, a sunrise, a sunset, or a solar irradiation. The processor may be in further electronic communication with a contextual sensor to collect contextual data, and wherein the processor is programmed to determine whether the first farm animal is distressed based on the physiological data about the first farm animal, the behavioral data of the first farm animal, the physiological data about the second farm animal, the behavioral data of the second farm animal, and the contextual data. The contextual data may include a location, a path, an activity, a time, a date, a relationship, a weather status, or any other information providing a context. The processor may be in further electronic communication with an environmental sensor to collect environmental data and a contextual sensor to collect contextual data, and wherein the processor is programmed to determine whether the first farm animal is distressed based on the physiological data about the first farm animal, the behavioral data of the first farm animal, the physiological data about the second farm animal, the behavioral data of the second farm animal, the environmental data, and the contextual data.

In an aspect, a system to determine whether a farm animal is distressed may include a first sensor tag generating behavioral data of a first farm animal, wherein the first farm animal is in a herd; a second sensor tag generating behavioral data of a second farm animal in the herd of the first farm animal, wherein the behavioral data of the second farm animal is contemporaneous with the behavioral data of the first farm animal; a contextual sensor to collect contextual data relating to the first farm animal and the second farm animal; a processor in electronic communication with the first and second sensor tags and the contextual sensor, the processor programmed to determine whether the first farm animal is distressed based on the behavioral data of the first farm animal, the behavioral data of the second farm animal, and the contextual data. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The processor may be in further electronic communication with an environmental sensor to collect environmental data, and wherein the processor is programmed to determine whether the first farm animal is distressed based on the behavioral data of the first farm animal, the behavioral data of the second farm animal, the contextual data, and the environmental data. The environmental data may include at least one of a temperature, a humidity, a precipitation, a pollen count, an air quality, a weather event, a season, a sunrise, a sunset, or a solar irradiation. The contextual data may include a location, a path, an activity, a time, a date, a relationship, a weather status, or any other information providing a context.

In an aspect, a computer-implemented method to infer a condition of an animal in a herd may include obtaining behavioral data and health data for a plurality of animals in the herd; selecting a subset of the behavioral data and the health data for use in a training data set to train a model for predicting a condition of a selected animal in the herd, wherein the training data set comprises known outcomes associated with the behavioral data and health data; training the model with the training data set to obtain a trained model; electronically sensing a current health data of the selected animal in the herd; electronically obtaining a current behavioral data of the selected animal in the herd; predicting a condition of the selected animal in the herd by inputting the current behavioral data and the current health data into the trained model. The computer-implemented method may further include selecting a subset of the behavioral data and the health data for use in a testing data set, and testing the trained model with the testing data set. Training the model may further include using environmental data, and known outcomes associated with the environmental data. The environmental data may include at least one of a temperature, a humidity, a precipitation, a pollen count, an air quality, a weather event, a season, a sunrise, a sunset, or a solar irradiation. Predicting may further include inputting a current environmental data. Training the model may further include using contextual data, and known outcomes associated with the contextual data. Predicting may further include inputting a current contextual data. The contextual data may include a location, a path, an activity, a time, a date, a relationship, a weather status, or any other information providing a context. The health data and the current health data may include vital signs. The behavioral data and the current behavioral data may relate to a whole herd behavior. The whole herd behavior may be a whole herd respiration rate. The whole herd behavior may be an average of the whole herd respiration rate. The whole herd behavior may be averaged or normalized. The behavioral data and the current behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The health data and the current health data may be obtained by non-invasive detection of an animal body function.

In an aspect, a system to determine whether a farm animal is distressed may include a first sensor tag adapted to be worn by or implanted, ingested, or inserted into a first farm animal, the first sensor tag generating physiological data about the first farm animal, and the first farm animal is in a herd; a second sensor tag generating behavioral data of the first farm animal; a third sensor tag adapted to be worn by or implanted, ingested, or inserted into a second farm animal in the herd of the first farm animal, the third sensor tag generating physiological data about the second farm animal contemporaneous with the physiological data about the first farm animal; a fourth sensor tag generating behavioral data of the second farm animal that is contemporaneous with the behavioral data of the first farm animal; a processor in electronic communication with the first, second, third, and fourth sensor tags, the processor programmed to determine whether the first farm animal is distressed based on the physiological data about the first farm animal, the behavioral data of the first farm animal, the physiological data about the second farm animal, and the behavioral data of the second farm animal.

In an aspect, a system for monitoring or managing livestock on a farm may include an in vivo sensor adapted to generate biological data regarding a parameter of an animal at a sensing interval; an external wearable device that communicates wirelessly with the in vivo sensor, the external wearable device receiving the biological data at a relay interval and relaying it to a remote location, wherein the external wearable device provides non-contact power to the in vivo sensor; and a processor at the remote location in electronic communication with the external wearable device that receives the biological data regarding the parameter of the animal at a communication interval, the processor programmed to: (i) assess a health risk for the animal based on the biological data generated by the in vivo sensor, and (ii) generate instructions to modify at least one of the sensing interval or the relay interval of the in vivo sensor, or the communication interval based on the health risk. The in vivo sensor may be one of ingested, implanted, or inserted. The external wearable device may be a sensor tag associated with the animal or a different animal. The biological data may relate to at least one of a temperature, a glucose level, a hormone level, a blood gas, an oxygen level, a blood chemistry, a pH, or an analyte. The relay interval may be an interval at which the in vivo sensor transmits the biological data regarding the parameter of the animal to the external wearable device. The communication interval may be an interval at which the processor receives the biological data regarding the parameter of the animal. The processor may be further programmed to generate instructions to determine if the health risk has decreased and to generate and transmit instructions to the in vivo sensor to decrease at least one of the sensing interval or the relay interval if the health risk has decreased. The external wearable device may be releasably attached to a mount permanently affixed to the animal. The external wearable device may also generate data indicative of at least one of a movement, a behavior, and a physiological parameter of the animal. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The processor may further generate instructions to modify at least one of a sensitivity or a communications power of the in vivo sensor based on the health risk. The processor may generate instructions, the processor is further programmed to consider at least one of a predicted in vivo sensor battery life, a mesh network performance, a received signal strength of the external wearable device, a proximity of the animal to a point of interest, a proximity to a suspected break in containment, or a desire to activate an actuator in proximity to the animal with the in vivo sensor.

In an aspect, a method for monitoring livestock on a farm may include providing an in vivo sensor to be one of ingested by, implanted in, or inserted in an animal; generating data of a parameter of the animal at a sensing interval when the in vivo sensor is ingested by, implanted in, or inserted in by the animal; electronically transmitting the data of the parameter of the animal at a relay interval to an external wearable device that relays the data to a server at a communication interval; with the server, determining a health risk of the animal based on the data of the parameter of the animal; with the server, generating instructions to modify at least one of the sensing interval or the relay interval based on the health risk; and modifying at least one of the sensing interval or the relay interval by transmitting the instructions to the in vivo sensor. The external wearable device may be a sensor tag associated with the animal or a different animal. The data may relate to at least one of a temperature, a glucose level, a hormone level, a blood gas, an oxygen level, a blood chemistry, a pH, or an analyte. The relay interval may be an interval at which the in vivo sensor transmits the data regarding the parameter of the animal to the external wearable device. The communication interval may be an interval at which the server receives the data regarding the parameter of the animal. The method may further include, with the server, generating instructions to determine if the health risk has decreased and to generate and transmit instructions to the in vivo sensor to decrease at least one of the sensing interval or the relay interval if the health risk has decreased. The external wearable device may be releasably attached to a mount permanently affixed to the animal. The external wearable device may also generate data indicative of at least one of a movement, a behavior, and a physiological parameter of the animal. The behavioral data may relate to at least one of a grazing habit, a grazing pattern, a feeding duration, a rumination, a drinking habit, a migration pattern, a sleeping schedule, a lying time, a reproductive activity, a congregation activity, or a proximity to another animals/stationary device. The method may further include, with the server, generating instructions to modify at least one of a sensitivity or a communications power of the in vivo sensor based on the health risk. The method may further include, with the server, generating instructions to modify at least one of the sensing interval, the relay interval or the communication interval based additionally on at least one of a predicted in vivo sensor battery life, a mesh network performance, a received signal strength of the external wearable device, a proximity of the animal to a point of interest, a proximity to a suspected break in containment, or a desire to activate an actuator in proximity to the animal with the in vivo sensor.

In an aspect, a computer-implemented method to conserve an in vivo sensor's power may include (a) training a model with a training data set for predicting a condition of an animal and obtaining a trained model, wherein the training data set comprises known outcomes associated with behavioral data and health data for a plurality of animals; (b) predicting a condition of an animal by inputting current behavioral data and current health data to the trained model; and (c) based on the predicted condition, tailoring a parameter of an in vivo sensor that detects biological data of an animal and relays it to an external wearable device. The parameter may be at least one of a sensitivity, a sensing interval, a relay interval, a communications interval, or a communications power of the in vivo sensor. The parameter may be further tailored based on at least one of: a predicted in vivo sensor battery life, a mesh network performance or a received signal strength of the external wearable device. The parameter may be further tailored based on at least one of: a proximity of the animal to a point of interest or a proximity to a suspected break in containment. The parameter may be further tailored based on a desire to activate an actuator in proximity to the animal with the in vivo sensor.

In an aspect, a method of configuring a mesh network for monitoring and managing livestock, the mesh network comprising a plurality of radio nodes, wherein at least one of the plurality of radio nodes is attached to an animal may include providing an augmented reality user interface that presents content and a real world view of a geographical area with one or more topographic features; for each radio node of the plurality of radio nodes, identifying a potential placement site in the geographical area; evaluating a performance of the mesh network by predicting the performance of the mesh network, the mesh network having the potential placement site for each radio node, based at least on the one or more topographic features and data regarding the animal; utilizing the predicted performance to generate a recommended placement site for each radio node of the plurality of radio nodes; and displaying, with the augmented reality user interface, the recommended placement site for each radio node of the plurality of radio nodes as content overlaid with the real world view of the geographical area.

In an aspect, a system to determine whether a farm animal is distressed may include a first sensor tag generating behavioral data or position data of a first farm animal, wherein the first farm animal is in a herd; a second sensor tag generating behavioral data or position data of a second farm animal in the herd of the first farm animal, wherein the behavioral data of the second farm animal is contemporaneous with the behavioral data of the first farm animal; a contextual sensor to collect contextual data relating to the first farm animal and the second farm animal; and a processor in electronic communication with the first and second sensor tags and the contextual sensor, the processor programmed to determine whether the first farm animal is distressed based on the behavioral data or position data of the first farm animal, the behavioral data or the position data of the second farm animal, and the contextual data.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 2A depicts a schematic of an animal mount.
FIG. 2B depicts a schematic of an object mount.

DETAILED DESCRIPTION

Figure 1A:
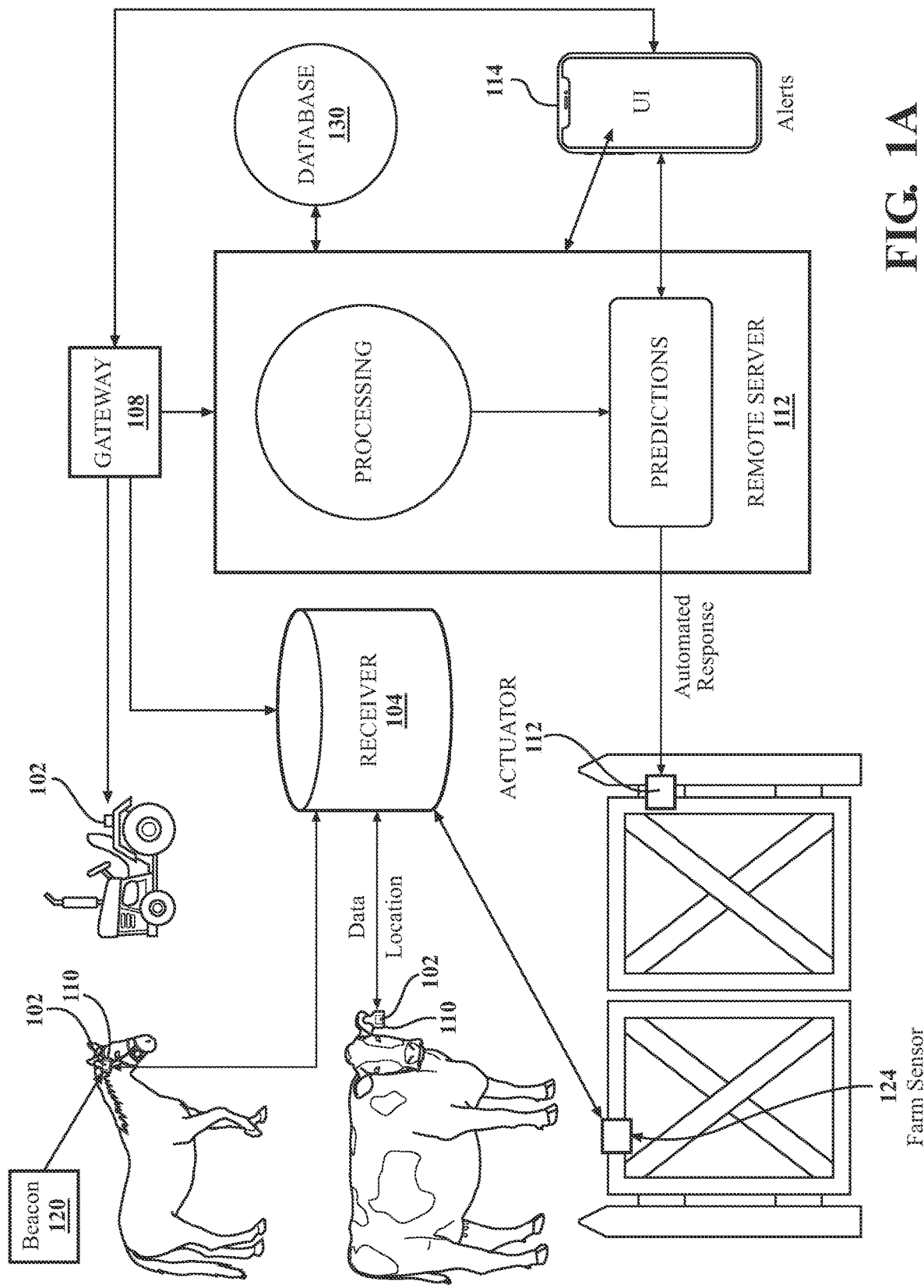
FIGS. 1A and 1B depict schematics of the system.
Figure 1B:
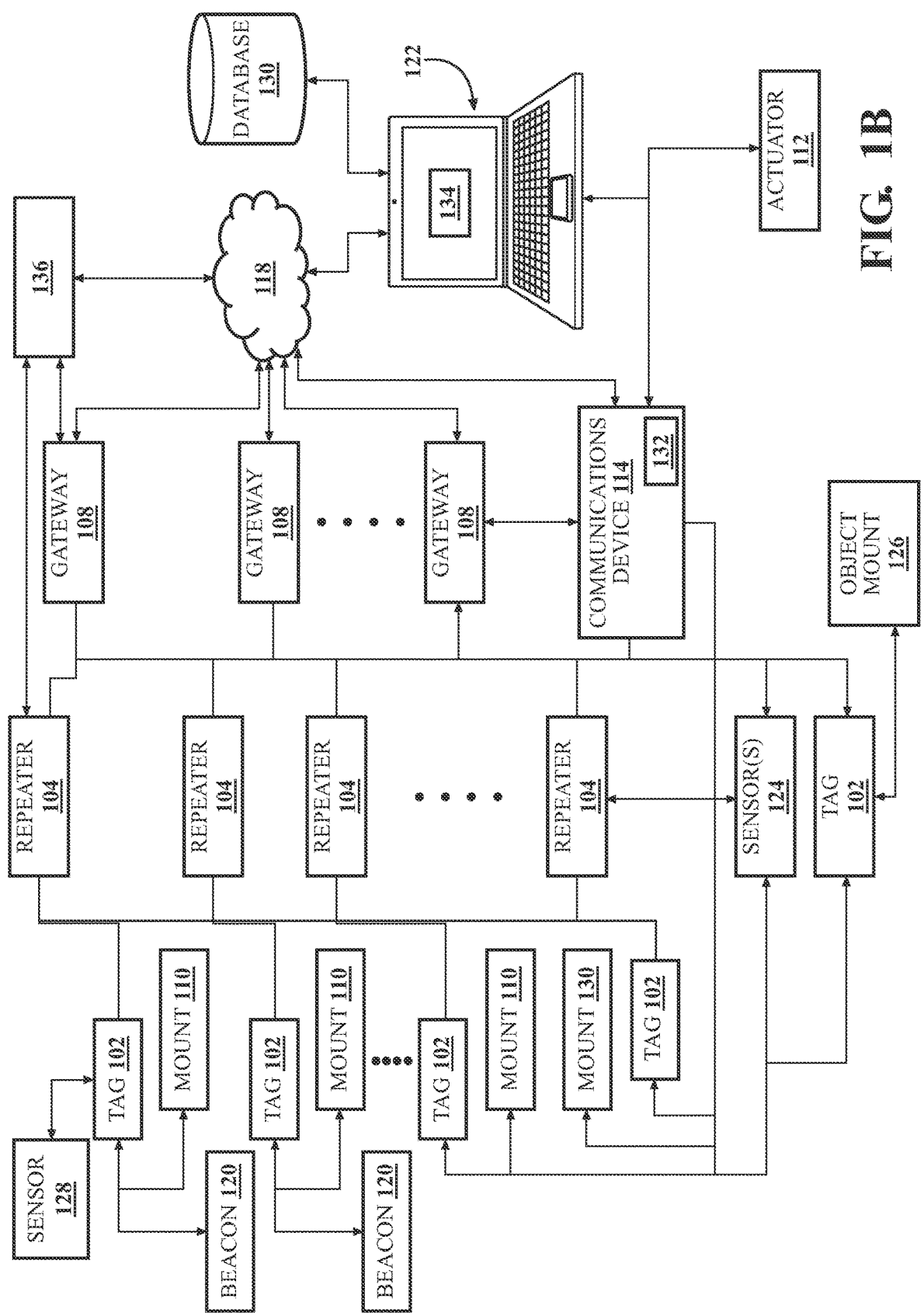

Regarding FIGS. 1A-1B, a system for animal tracking and management 100 in an agricultural location, such as a farm, is depicted. Although references to a farm will be made throughout this application, it should be understood that this is for exemplary purposes and should not be seen as limiting applications to a farm. The disclosed methods and systems are also applicable for other agricultural settings such as ranches, small backyard applications, as well as when animals are located away from the farm, such as on the road, at a show, and the like. It will also be apparent to those skilled in the art that the disclosed methods and systems may be applicable in other nonagricultural settings, especially those facing similar challenges to the small farm, including asset tracking, monitoring or management in an environment having aspects that may interfere with communication such as moving or living animals or irregular contour of land or space.

In reference to the Figures throughout this description, all two-way arrows indicate communication between or among components of the system. For readability not all communication pathways are shown in all figures. The absence of a line between two components does not indicate the inability of the components to communicate with one another, or a lack of association. Thus, data exchanged in the embodiments described herein has a plurality of paths, both direct and indirect. Also, communication between components described herein is meant to encompass both two-way and one-way communication. The communication may be direct or indirect via an intermediate device, such as for example, a repeater.

There may be a plurality of beacons 120, distributed around areas of interest on a farm, broadcasting information, such as location information (including location), beacon ID, and the like. The broadcast location may be received by a plurality of sensor tags 102 (also referred to as wearable sensors, animal worn radio devices or nodes). A sensor tag 102 may be associated with an animal mount 110 and in communication with one or more repeaters 104, other sensor tags 102, beacons, communication devices 114 which interact with gateways 108 to communicate with a processor or remote server 122 located in the cloud 118. References to communication devices 114 are meant to encompass smart phones 114 and the terms may be used interchangeably. References to a processor are meant to encompass one or more processors or processing units. A processor programmed to perform the functionality herein may be located in remotely as described herein, but a processor may be located in any one of the components of the system described herein including but not limited to gateways, object mounts, animal mounts, beacons, tags, mobile devices, communications devices, sensors, nodes, and radio devices. References to a remote server 122 should not be considered limiting and may include a plurality of processors, a plurality of servers, a cloud computing platform, or cloud computing-based services. A remote server 122 may interface with a database 130, artificial intelligence and machine learning platforms. Additional farm sensors 124, which may be optionally connected with an object mount 126, may be attached to farm equipment and infrastructure. Additional sensors may be in vivo sensors 128 which relay information through a tag 102 attached to the same animal or a nearby animal. The additional farm sensors 124 may be in communication with the one or more sensor tags 102, the repeaters 104, gateways 108, smart phones 114, and the like to communicate information to and receive information from the remote server 122. There may be a communications device 114 such as a mobile phone, tablet, and the like, which may communicate with the remote server 122 as well as with the gateways 108, repeaters 104, tags 102, animal mounts 110, object mounts, actuators 112, and the like. The remote server 122 may include or be in communication with a database 130 having information including an association between an individual animal mount 110 or object mount and a sensor tag 102 and physical, positional and behavioral data associated with the individual animal, the object, and the like.

Each beacon 120 may regularly transmit (advertise) location information, unique identification information, data message, and the like, which is utilized by tags 102 and communications devices (smart phones) 114 within range. A beacon 120 broadcast may be used to establish a location for a tag 102 or proximity of a tag 102 to an interesting location or object, without the need for triangulation, multilateration, other more power-intensive technologies (e.g., GPS), and the like. When fixed, a beacon's 120 location may be known to a remote server 122 located in the cloud 118 and stored in a database 130 in communication with the remote server 122. In this way, received beacon 120 broadcasts provide location context for data received from a sensor tag 102. The placement of beacons 120 may be designed such that the location of any sensor tag 102 within range may be bounded and a sensor tag's 102 location may be determined with greater precision for places of particular interest (e.g., Sensor Tag "A" is close to Feeder "1"). A beacon 120 may broadcast fixed information at a fixed interval, or broadcast content and interval may be set or changed by a user using a communications device 114 or by the remote server 122 using the cloud 118 connectivity provided by the communications device 114 or gateways 108 or repeaters 104. In an illustrative and non-limiting example, the transmission rate of a beacon 120 may be increased (transmission interval decreased) so that less power is required for sensor tag(s) 102 to detect the beacon 120 because they will be able detect the beacon 120 more quickly (thus they won't have to scan for such a long period) as there is a smaller transmission interval. In an illustrative and non-limiting example, the transmission rate of a beacon 120 may be decreased in a location (such as a barn) when the animals are known to be elsewhere (e.g. out at pasture).

Referring to FIG. 2A, an animal mount 110 may include a rugged animal attachment mechanism 203 to secure the animal mount 110 to the animal. There are a plurality of implementations or classes of animal mounts 110 where the geometry of the animal attachment mechanism 203 for attaching the animal mount 110 to the specific animal type is determined for a particular type of livestock, such as cattle, horses, sheep, goats, birds, and the like. There may be multiple placement locations for different mounts such as an ear tag, rear leg pedometer, upper tail ring, and the like. In embodiments, the animal mount 110 including a releasable tag attachment mechanism 212 may be incorporated directly into a device or accessory used with an animal such as a halter, bridle, saddle, blanket, turnout sheet, identification collar with or without counterweight, bell boot, and the like. Design considerations for the mount 110 and animal attachment mechanism 203 may include placement location for effective sensing, animal comfort/tolerance, the ability maintain position/orientation over time, resistance to animal damage such as rubbing or rolling, resistance to loss, suitability for desired sensing, and low hazard to the animal. The releasable tag attachment mechanism 212 may be any of a snap, a latch, a rivet, a magnet, a release buckle on a webbing strap, a hook-and-loop fastener, an adhesive, interference fit mechanism, or the like.

An animal mount 110 may comprise a releasable tag attachment mechanism 212 and a passive RFID device 211 that may include a passive mount ID 204, a mount processor 208, and a mount passive transceiver and antenna 210. While references will be made throughout to RFID it should be understood that this is intended to be representative of a variety of contactless, radio wave identification technologies such as NFC (Near-field communication) which operates at 13.56 MHz at ranges of less than 20 cm, animal identification tags operating at 120-150 kHz with a range of 10 cm, and the like. The animal mount 110 may have an optional animal attachment mechanism 203 if it is not built into an animal accessory. The animal mount 110 may have optional visible characteristics 202 such as color, unique serial number, identification information such as farm ID information, and the like. In embodiments, the optional visible characteristics 202 such as color and placement of the animal mount 110 may be indicative of the type of the animal rather than unique to that specific animal (such as a unique serial number). In an illustrative example, animal mounts 110 that have animal attachment mechanisms that are similar (or even identical) but which are used in different applications (e.g., Dairy Cow ear tag vs. Beef Cattle ear tag) may be visually distinct (e.g., using color) to aide in identification. Attachment location (e.g. right ear vs. left ear) may be indicative of animal gender. The animal attachment mechanism 203 may be designed so as to permit the use of industry-standard animal attachment mechanisms such as ear tagging methods, accessories and tools. Ear tags are prevalent in dairy, beef, goat, and sheep operations and the geometry of tags from various manufacturers are very similar and incorporate geometry that is field proven for durability.

The passive mount ID 204 may include a unique serial number, farm ID information, type of livestock, intended placement location on the animal, gender, breed, and the like, which may be accessible to a commissioning device (e.g., an RFID device) as discussed elsewhere herein, using the mount passive transceiver and antenna 210. In embodiments, the animal mount 110, passive mount ID 204, or both may also provide the tamper-resistant animal traceability required by food safety legislation. In embodiments, the passive mount ID 204 may be programmed with data regarding the animal at the time of installation of the animal mount 110 on a specific animal.

The mount processor 208 may control the interface between the passive mount ID 204 and the mount passive transceiver and antenna 210. A subset of the information in the passive mount ID 204 may be provided by third party organizations such as the Meat and Livestock Association (MLA), required by government regulations, and the like.

A releasable tag attachment mechanism 212 may be designed to secure the tag 102 in such a way that, while the tag 102 may be easily released from the releasable tag attachment mechanism 212 and replaced with a new tag 102, the tag 102 is secure even in challenging environments (e.g. extreme temperatures, mud, snow, water, physical abrasion, and the like. In some embodiments, the tag attachment mechanism 212 is designed such that a tag 102 may be removed and easily replaced without removing the animal mount 110 from the animal. The tag attachment mechanism 212 may be designed so as to permit the use of industry-standard animal attachment mechanisms such as ear tagging methods, accessories and tools. Ear tags are prevalent in dairy, beef, goat, and sheep operations and the geometry of tags from various manufacturers are very similar and incorporate geometry that is field proven for durability. The tag attachment mechanism 212 may be common across a plurality of classes of animal mounts 110 such that a universal tag 102 may be used in multiple classes of animal mounts 110.

Referring to FIG. 2B, an object mount 126 may be similar to an animal mount 110 but rather than an animal attachment mechanism 203, an object mount 126 may have an object attachment mechanism 205. There may be a plurality of classes of object mounts 126 having different object attachment mechanism 205 designed to attach to different types of objects and infrastructure such as tractors, tools, saddles and other tack, water troughs, mangers, gates and the like. A tag attachment mechanism on an object mount 126 may have the same geometry as a tag attachment mechanism 212 of an animal mount 110 such that a tag 102 may be used in either an animal mount 110 or an object mount 126. The object mount 126 may also include a passive RFID device 211 which may include an object ID 207, a processor 208 and passive transceiver and antenna 210. The object mount 126 may interact with a tag 102 as described elsewhere for an animal mount 110 and a tag 102 may be associated with the object mount 126 in a manner similar to that described elsewhere herein for an animal mount 110.

Figure 2C:
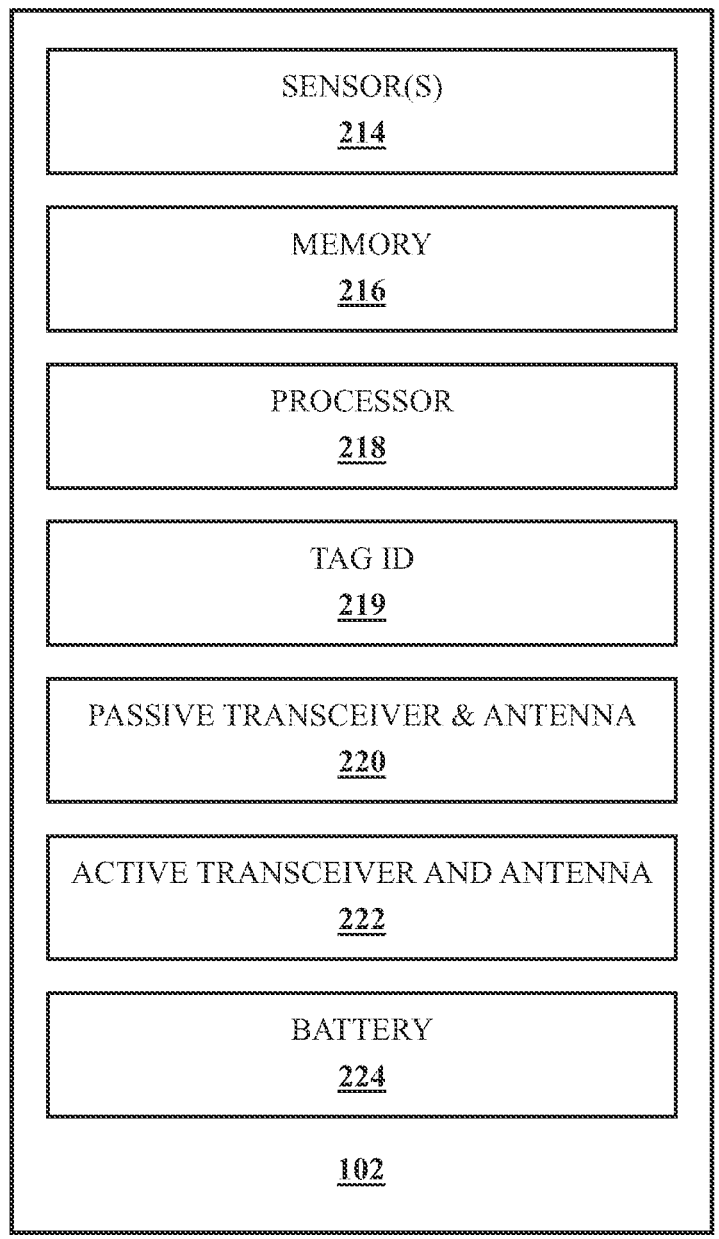
FIG. 2C depicts a schematic of a sensor tag.

Referring to FIG. 2C, a tag 102 is a small, battery powered device which operates for an extended period (months or years) and may be replaced when its battery is depleted. A tag 102 may include one or more sensors 214, such as position, orientation, posture, motion, ambient temperature, acceleration, physiological data/parameters of the animal (such as internal temperature, heart rate, respiration and the like), gas sensors, microphones, and the like. A tag 102 may include a tag ID 219, a passive transceiver and antenna 220, an active transceiver and antenna 222, a processor 218, memory 216 and a primary (non-rechargeable) battery 224. In embodiments the above transceivers and antennas 220 222, processors 218 and memory 216, one or more sensors 214 may be separate components, integrated in a single component, or some variant thereof. Forgoing a replaceable battery and serviceable enclosure enables a robust, single-piece assembly without joints or fasteners and facilitates a tag 102 that is impervious to water and dirt, at a lower cost. A tag 102 may communicate data acquired by the sensors 214 using the active transceiver and antenna 222 through the mesh network or a mobile device back to the remote server 122. The tag 102 may store data from sensors 214 and then transmit the data when a specified volume is reached, at a specified frequency or when a sensor 214 reading crosses a specified threshold. A first tag 102 may receive transmissions from other tags 102 and sensors 124, 128 (FIG. 1B). The first tag 102 may forward the received data from the other tags 102 and sensors 124, 128 to a repeater 104, a gateway 108, a communications device 114, and the like. The other tags 102 or sensors 124, 128 may be located on the same animal but have a reduced signal due to location on the animal (e.g. an ear tag might have a better signal than an anklet) or animal stance (e.g. an ear tag may not have a better signal when the animal's head is down). Also, in some cases, animals may have internal, in vivo sensors 128 such as a reticulorumen bolus (in reticulum), tail head inject, and vaginal bolus with a limited communication range. A tag 102 may also forward data from the in vivo sensors 128. A sensor tag 102 may transmit time, location data, positional or stance data (a head position, a body position, a body elevation, a movement, or a stance) as well as data from its sensors as well as other in vivo sensors 128, farm sensors 124, data from other sensor tags 102, and the like. Positional or postural data may be based on one or more of an inclinometer, an accelerometer, gyroscopes, barometric pressure sensor, a GPS sensor, and the like which may be located in a tag 102, or an in vivo sensor 128. In some embodiments, a tag 102 may comprise an emergency locater which may include direct cellular or satellite connectivity and/or GPS capability. Tags 102 with an emergency locator option may be reserved for valuable animals, herd leaders (where the location of the herd might be determined based on the location of the herd leader), animals which are frequently off site such as horses (such as part of a rider down system).

A tag 102 may be associated with a specific, permanent, animal mount 110 or object mount 126 as described elsewhere herein (FIGS. 2A-2B). The tag 102 may be configured to provide specific functionality upon being associated with a particular class of animal mount 110 or object mount 126. When the battery 224 inside a tag 102 becomes depleted, the tag 102 may be removed from its mount 110, 126 and discarded. A new tag 102 may then be affixed to the animal mount 110 or object mount 126 and commissioned as disclosed elsewhere herein. Because an animal mount 110 or object mount 126 may already be associated with a specific animal or specific object, a new tag 102 may be immediately activated, and data from the new tag 102 correctly merged with data from the previous tag 102 without further user action as described elsewhere herein.

A farm sensor 124 (FIGS. 1A-1B) may include one or more sensing devices and a communications module. A farm sensor may or may not be configurable (similar to the tag 102) depending on the specific application. A farm sensor 124 may measure and report one or more parameters that may provide context for interpreting data from a tag 102. Sensing devices may measure ambient weather such as temperature, humidity, wind, light levels, and the like, as well as weight, the presence or absence of an objects, water level/flow, feed level, feed release tripped, and the like. A farm sensor 124 may detect the state of equipment (fans, etc.), position of gates and doors, occupancy detectors, ambient light levels, noise, dust, gas (e.g., ammonia levels), and the like In an illustrative and non-limiting example, a farm sensor 124 may be associated with a water container "A" may measure water levels in that container and may then report 2.5 gallons. After a tag 102, associated with Horse "1," is detected near water container "A" a new report of 2 gallons may be received. The remote server 122 may then determine that it is probable that Horse "1" consumed 0.5 gallons of water.

In embodiments, a farm sensor 124 may accept user input to mark events such as stall cleaned, feed delivered, and like or to track workflow steps. In embodiments, a farm sensor could use a change in a measurable quantity to track workflow steps without direct user involvement.

In embodiments, a farm sensor 124 at a fixed location may further include a beacon broadcasting information such as location, beacon ID, and the like which may assist in determining the proximity of a tag 102 to the farm sensor 124 may be established. In embodiments, a farm sensor 124 may be associated with a mobile object, such as a trailer, tractor, saddle, and the like, and may sense parameters related to the location or operation of such an object.

An actuator 112 may perform an action in response to a command from the remote server 122, direct activation by a nearby device such as a tag 102, communications device 114, and the like. An actuator 112 may be a mechanical device such as a latch, a door, a valve, and the like. An actuator 112 may be an electrical output such as dry contact, voltage output, and the like to generate a farm indicator to signal animals or people, activate an appliance such as a fan or heater, and the like. A farm indicator may be a visual, audible, or haptic indicator. In an illustrative and non-limiting example, a cooling fan may activate only when an animal tag is detected in the vicinity, reducing energy use.

A repeater 104 (FIGS. 1A-1B) may include one or more, specialized wireless transceiver(s) capable of communicating with tags 102 and farm sensors 124, simultaneously operating an ad-hoc mesh network, including rebroadcasting the received data to reach a gateway 108 or a communications device 114 capable of transmit data from different tags 102 and farm sensors 124 to a remote server 122. Repeaters 104 and gateways 108 may be line-powered or use a combination of solar panels and one or more batteries. The physical locations of repeater 104 may be known to the remote server 122 and/or database 130 such that the location of a tag 102, communication device 114, and the like may be estimated by knowing the distance, angle, or both to three or more repeaters 104 or gateways 108 in range. In some embodiments a repeater 104 may also act as a location beacon 120 and broadcast data regarding its location, either specific geographic location or logical location, such as "Pasture 1", or unique identification.

A gateway 108 (FIGS. 1A-1B) may act as a data collector for the facility (e.g. farm). There may be a limited number of gateways 108 at a specific facility. A gateway 108 communicates, via a mesh network, with tags 102, sensors 124, 128, repeaters 104 and acts as a communication relay between these and a remote server 122 located in the cloud 118. In embodiments, a gateway 108 may also act as a beacon 120 and/or a repeater 104. In embodiments, a gateway device may be mobile, such as a on a vehicle or trailer, or transportable to extend system functionality while in transit or at off-premises events such as a fair, an auction, an expo, a horse show, and the like.

Communications between tags 102, sensors 124, 128, repeaters 104, gateways 108, and communication devices 114 may leverage one or more low power, short range wireless protocols such as ZigBee, Thread, Bluetooth, Z-wave, 6LoWPan and the like. The communication protocol may be selected such that the range is sufficient to transmit data across anticipated distances such as across a pasture. In embodiments, the system may use a combination of Bluetooth Low Energy (BLE) and Thread/Zigbee to leverage new transceivers that support both technologies concurrently. In an illustrative and non-limiting example, the BLE range should be sufficient to transmit data from a tag on an animal to a repeater on a fence line of a field. The repeater could, in turn, use the same or different technology to transmit this data to the gateway or communication devices. In embodiments the communication protocol may be selected such that components may also communicate with communication devices 114 that happen to be in range, such as smart phones, that may be carried individuals on the farm or at off-farm events as described elsewhere herein.

In embodiments, a gateway 108 may communicate with the cloud 118 using any number of internet protocols such as Cellular, Ethernet, WiFi, Satellite, private terrestrial links, and the like. A gateway 108 may require only very a low data rates and may tolerate long connection intervals enabling the use of low cost, low power, wireless protocols such as LTE CAT M1, NB IoT, or LoRa, and the like. The gateway may further reduce communications demands by batching transmissions from multiple tags to the cloud, caching relatively static cloud data, adapting communications intervals based on cloud feedback, and the like.

Repeaters 104 and gateways 108 may advertise their presence, health, relative to availability, and the like. They may elect to interconnect and form an ad hoc mesh network to which tags 102 and farm sensors 124 may connect. The ad hoc mesh network may be used to send information between the cloud 118 or a remote server 122 and one or more tags 102, farm sensors 124, actuators 112, and the like. One or more gateways 108 may communicate information between a remote server 122 having a system application 132 and/or a communications device 114 having a system application 134 via the cloud 118 and tags 102, farm sensors 124, beacons 120, actuators 112, communication devices 114, and the like. The system applications 132, 134 may be accessed on a remote server 122 or a communications device/smart phone 114 respectively. In some embodiments, a network sniffer may be installed as part of the system to monitor the performance of the mesh network.

When presented with multiple communications paths to the remote server 122 or cloud 118, tags 102, farm sensors 124, beacons 120 and actuators 112 may be adapted to use the least-costly or most power-efficient option. In an illustrative and non-limiting example, a tag on a farm with multiple beacons 120, repeaters 104 and a gateway(s) 108 may collect location information from the beacons and repeaters, but use a nearby communications device to send data to the cloud, thereby eliminating the need for repeaters to relay the message and a gateway to initiate a new data transmission that may incur per-byte charges.

In embodiments there may a system using a mesh network sniffer and performance prediction to facilitate the planning and provisioning of a mesh network comprising beacons 120, repeaters 104, gateways 108, tags 102 and the like through awareness of natural and man-made topographic features (hills, stone walls, valleys, wallows, ponds, watering holes, tree lines, shrubs, forested areas, and the like), field layout, and expected animal/animal tag 102 distribution. The system may allow an installer and/or the farmer to visualize performance challenges and adjust node placement accordingly.

Figure 3A:
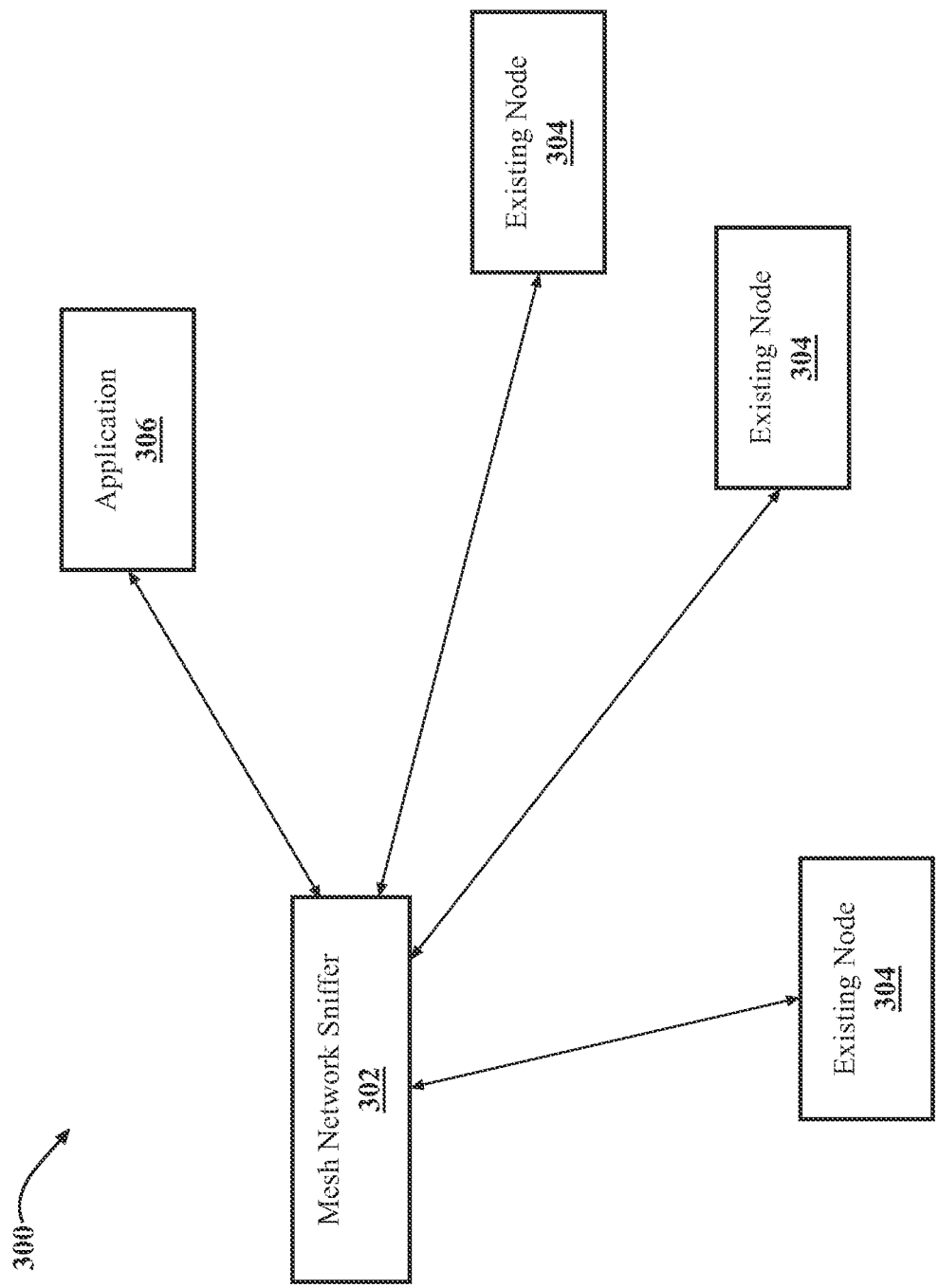
FIGS. 3A-3B depict a planning and installment system
Figure 3B:
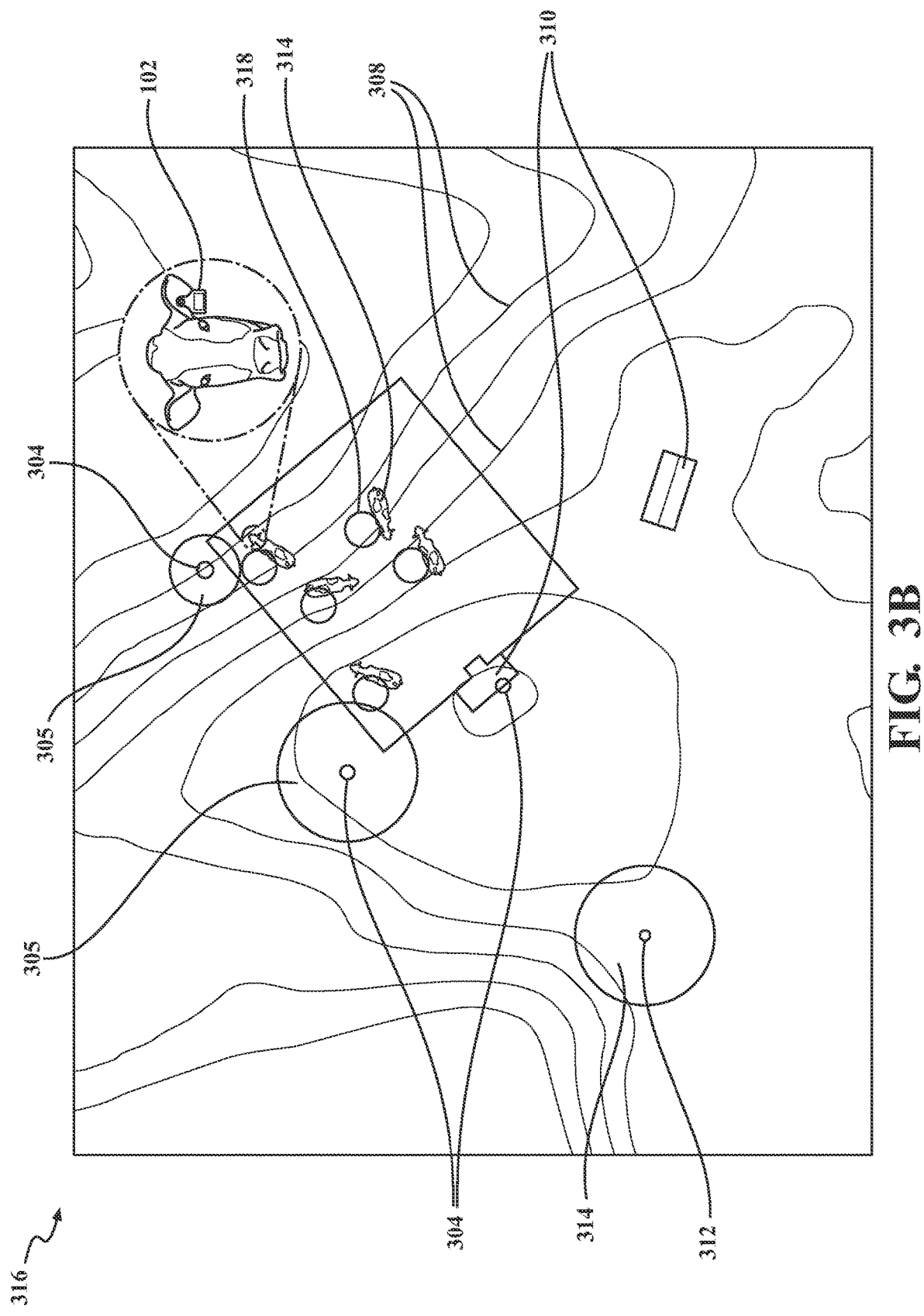

Referring to FIGS. 3A-3B, a planning and installment system 300 may include a mesh network sniffer 302 to identify existing nodes 304, signal strength and coverage for the existing nodes 304, and a mobile and/or cloud based application 306 (which may be a part of the system applications 134) in communication with the remote server 122 and system application 132. The application 306 may include a user interface accessible via a graphical display. The user interface may accept user input from a variety of input devices including voice activation, keyboard, touch-screen, movement of a mobile device in space and the like. The application 306 may be aware of the geographic topography of a location, and, using the graphical display, may provide a visual depiction of a geographic area by displaying a 2-dimensional map or 3-dimensional visualization, such as location aware augmented reality or virtual reality, comprising topographic features of the geographical area including geographic contour lines 308, manmade features 310 such as stone fences, buildings, and the like. The application 306 may guide a farmer through a site survey, evaluate performance and recommend optimum placement, and then guide the farmer through installation of components.

The application 306 may allow for a user to annotate fences, field layout, field purpose (pasture vs. crops) which may impact coverage needs. The application 306 may allow for a user to provide additional information regarding anticipated performance challenges such as materials for manmade objects, anticipated areas of animal congestion such as field entrances, feeding stations, anticipated average number of animals, anticipated species of animals in a given field, average mass for different species or types of animals, anticipated animal roaming and herd behavior, average number of tags 102 and placement/location of a tag(s) 102 on animals of different species, and the like. There may be a database documenting signal obstruction profiles for different types of materials (e.g. wooden building are less obstructive than metal buildings), and thickness or volume (e.g. obstruction based on animal size, animal species, and the like).

Further, the application 306, may enable entry of an anticipated number of animals 314 to understand their impact on network performance. Animals 314 and the anticipated tag signal strength 318 from tags 102 associated with the mobile animals 314 may also be shown as an overlay in the application 306. Additionally, fencing of animals may result in control points/pinch points in the flow of the animals which may be used to assist with the placement of receivers. Large numbers of animals or large congregations of animals may indicate the need for additional nodes to provide adequate coverage due to the absorption properties of the animals, relocation of a subset of the animals to another location, change in placement of nodes on the animals (ear tag vs. bell boot), or the like.

Further, the application 306, may enable entry of the desired location accuracy for different areas of the farm. For instance, in an open pasture, location accuracy to within 10 meters may be sufficient, whereas near feeding stations, an accuracy of 1 m may be desired. The application 306 may enable entry of geo-fencing constraints to limit certain types of animals to certain fields such as pasture vs. crop fields, bull separated from cows, and the like based on the animal's tag 102 data.

This information may be used to optimize positioning of new nodes, while minimizing the required number of additional devices, such as beacons, 120, repeaters 104, gateways 108 and the like. The application 306 may include a map manager that, based on the information, may determine a plurality of radio nodes needed to provide appropriate cover and identify proposed placement sites on the map for each of the determined radio nodes. The map manager may further identify potential signal obstructions on the map given the geographic topography, manmade obstructions, anticipated animals and animal distribution. The application 306 may include a prediction facility which may evaluate a predicted network performance given the proposed placement sites, the topographic features over which the network must extend, and data regarding the animals. For example, anticipated areas of animal congestion may have both higher levels of signal obstruction due to animal mass (average mass may vary with animal species/type) as well as a higher number of tags 102 (average number of tags per animal may vary with animal species or be entered by user) which may act as mini-repeaters passing data from tag 102 to tag 102 if no repeater 104 or gateway 108 is within range. Knowing the animal species may provide insight regarding whether they are prone to herding and herding behavior, (e.g. are all the animals in a field likely to be within a certain distance of one another, close to a specific topographic feature such as a wallow, or evenly distributed through the field). Knowing a likely orientation for the animals (e.g. cattle tend to align their bodies in a N/S orientation when grazing or resting) may provide information regarding how the amount of obstruction created by the animals might vary depending on the direction of signal propagation being modeled (e.g. would the signal be passing longitudinally through the animal or side to side)? Knowledge regarding the animal species might alter possible vertical range of obstruction (e.g. cattle are bigger and taller than sheep, goats and sheep are similar in size, but goats climb so may provide obstruction over a great vertical range). The animal species may also impact the expected magnitude and duration of certain signal impairments (e.g., the difference between the resting and grazing height off ground level for a horse is much greater, say, than a sheep. A ruminant species will take long regular breaks during grazing for the chewing/regurgitation cycle, during which time the head will be erect and an ear-mounted sensor will experience less signal attenuation. The prediction facility may then use the predicted performance to reoptimize the proposed placement of the new radio nodes and generate a recommended placement site for each of the new radio nodes. The application may further display each of the new radio nodes at their recommended placement site as an overlay to the topographic map.

The application 306 may allow a user, using the user interface, to alter one or more potential or recommended placement sites. Alterations may include an alteration to the number, species, geographic location, and the like of the animals on the farm. Alterations may include altering the number or location of tags 102 on the animals. The application 306 may then reevaluate the performance of the mesh network and determine whether the mesh network is resilient to the altered placement(s) sites proposed by the user. The application 306 may then reevaluate the performance of the mesh network and determine whether the mesh network is resilient to the changes regarding the animals.

The map manager and prediction facility may include algorithms to calculate optimum placements of repeaters 104, gateways 108, and beacons 120 given current mesh performance, topography, anticipated animals, and the like. The consideration of geographic topography facilitates the system's ability to suggest node placement to maximize coverage while minimizing the number of nodes. In some embodiments, the map manager and prediction facility may include or access machine learning to improve the algorithms based on data documenting changes in mesh performance with changes in the number and/or placement of network nodes. The system may include obtaining feedback data including mesh network performance and radio node coverage after new radio nodes have been positioned as recommended as well as documenting the animal distribution and the time of data collection. A subset of the feedback data may be used a training set for the machine learning to improve the models and algorithms used by the map manager and prediction facility. In some embodiments the selection of the subset of the feedback data may be partially based on identifying instances where the performance exceeded an anticipated threshold. In some embodiments a subset of the feedback data may be used as a testing data set to verify the model and algorithms.

The application 306 may include access to maps, surface and aerial photographs, and other geospatial data, and of the location over which, network performance, fence lines, place names, geographic fencing may be overlaid. Maps, photography, and geospatial data may be imported from third party providers, imported from drone video, imported from a third-party 3D mapping device, such as a LiDAR device, import of iPhone distance sensing and video, and the like. A user of the application, such as a farmer, may annotate the map with additional information such as fence lines, pasture edges, if not obvious, farm borders, boundaries, place names, existing network nodes, and the like. A user of the application 306, such as a farmer, may annotate the map with additional information about manmade objects such as a fence line, a feeder, a trough, a waterer, a farmhouse, a pole, a barn, a henhouse, a shed, a shelter, a corral, a pasture, a field and the like. This may be used to identify pinch points, areas in need of higher bandwidth, and areas which require greater location accuracy, such as gateways between pastures, feeding stations and the like. This information may be used to facilitate the placement of repeaters 104, gateways 108, beacons and the like.

The application 306 may include display modules 316 for displaying the maps (both 2D maps and 3D interactive AR/VR visualizations) of the facility disclosed above and elsewhere herein with overlays showing network signal strength and coverage 305, locations of identified nodes 304, and the like, enabling a farmer or installer to easily identify gaps, potential signal obstructions and adjust proposed or actual location of devices. Overlays may include anticipated network signal strength and coverage 315 for proposed nodes 312 and areas with poor coverage due potential signal obstruction from identified topological or manmade obstructions. Information obtained from the mesh network sniffer (active or passive) may be overlaid on the topographical map to determine if the node placement is resilient to topography (e.g. are there zones where the coverage may be poor due to potential signal obstruction from intervening fences, hills, large congregations of animals, and the like). As beacons 120, repeaters 104, and gateways 108 are placed/positioned the system may verify the predicted coverage and signal strength using the mesh network sniffer and the application to view the coverage provided. The new nodes may be placed by the user, placed by an algorithm to maximize performance, and the like. Potential placement sites may include one or more of a fence line, a feeder, a trough, a waterer, a farmhouse, a pole, a barn, a henhouse, a corral, a pasture, a field and the like. Information may be collected on the resulting mesh network performance using either a hand held network sniffer or by fixed location sniffer node 136. This information regarding the new node placement(s) and resulting network performance may be fed back into a machine learning system to improve future predictions.

The system may also be used to update the mesh network as new pastures, buildings and the like are added. The system may also be used to update the mesh network based on livestock changes. The system may allow a user to enter proposed alterations or changes to the topography such as the addition of a pond or changes to manmade objects, such as the addition or removal of a building. The system may allow a user to entered proposed or anticipated changes to the number and type of animals, changes to tagging, and the like. The changes to the topography and livestock may also result in additional changes such as different animal congregation behavior given a new pond, of changes in gate placement. Given the alterations, the system may then reevaluate the performance of the mesh network (signal strength and coverage) and provide the user with a map displaying anticipated changes as a result of the proposed changes to topographic features, manmade features, livestock, and the like. These may display as additional representations of coverage or as an overlay of display showing the current coverage. In embodiments the information regarding anticipated impact on network coverage may be used to facilitate placement of the proposed new feature (such as siting of a new watering system). In embodiments, the system may be designed to suggest alterations (within a specified range) of the placement of the new feature so as to optimize coverage. The system may be used to trouble shoot the mesh network.

Figure 9:
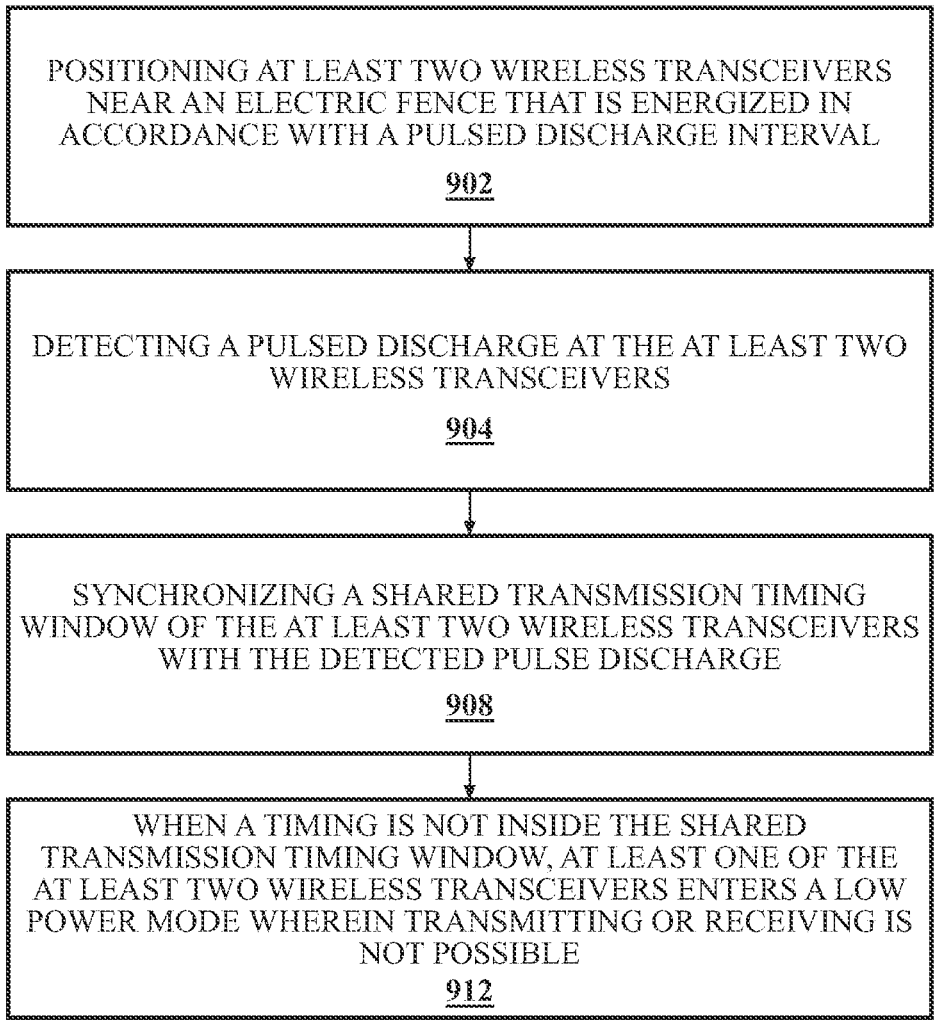
FIG. 9 depicts a process for operating a power-efficient ad-hoc mesh network.

In embodiments, electric fences, which are already commonly used for animal containment in animal husbandry, may be leveraged to provide greater mesh network coverage with lower power consumption (higher power efficiency). Electric fences operate on pulsed discharges of 2 kV-10 kV delivered by a central fence "charger" where discharges occur once every few seconds. Referring to FIG. 9, in embodiments, at least two nodes (wireless transceivers), such as repeaters 104 and/or gateways 108, are positioned near an electric fence which is energized in accordance with a pulsed discharge interval (step 902). The at least two nodes may detect the pulsed discharges (step 904) using non-contact means such as by detecting the change in the electromagnetic field due to the pulsed discharge. The nodes may synchronize wireless transmissions using the pulsed discharges as a heartbeat signal to create a shared transmission timing window (step 908). One or more of the repeaters 104 and gateways 108 may operate in a low power mode until awakened by the magnetic field generated by the pulsed discharge. Upon waking up, the device may send and receive data and then return to the low power mode. When the timing is not inside the shared timing window, at least one of the at least two nodes enters a low power mode where transmitting or receiving is not possible (Step 912). In embodiments, one or more of the repeaters 104 and/or gateways 108 may be powered by energy harvested from the electric fence. The intermittent nature of the transmissions may reduce power consumption compared to operating continuously. Because the fence-synchronized nodes are more power-efficient, they may be less costly due to the need for less batteries, smaller solar panels, and the like. The smaller field devices may be less prone to animal damage as well. As an added benefit, loss of the synchronization pulse by a given node may indicate fence damage, which could be then reported to the farm operator. Upon loss of the synchronization pulse, the affected node(s) may discontinue transmissions or may revert to a continuous transmission mode. In embodiments, as part of the response at a node to the loss of the synchronization pulse would be to switch to synchronous communications and send an alert of a possible electric fence breakage to the application. In embodiments, the application would detect the change in transmission from the node (e.g. loss of communications with the node or change to continuous transmissions by the node). Upon determining that a node has been affected, an alert of a possible electric fence breakage may be triggered. In configurations with multiple nodes synchronizing on the same fence line pulse, the loss of multiple nodes might be the basis for a higher confidence determination of a possible electric fence breakage or better pinpoint the location of the issue.

In embodiments, when the alert is triggered, the application may identify one or more animal tags whose last or most recent locations were in the vicinity of the affected node or the electric fence with the possible breakage. The application may allocate additional resources in tracking (e.g., increase a tracking frequency, increase transmit power, acquire higher fidelity motion or heading date from the tag's sensors) on the one or more identified animal tags. The increased tracking may enable early detection of potential movement of the animals out of one or more pastures associated with the electric fence with the possible breakage and aide in speeding recovery of the escaped animal.

In embodiments, when a tag 102 loses connectivity, whether due to a break in the electric fence or other reasons such as the animal escaping and moving out of range of the network, those tags having emergency locator functionality (e.g., GPS and/or cellular components) may be configured to begin transmitting their location and behavioral data (e.g., motion, heading, vital signs) to the remote server 122 using their cellular connection.

In cases where a farm has multiple fence chargers, for example serving different pastures, one repeater 104 or gateway 108 may be attached at to each fence circuit and set to operate in a bridging node. These bridging devices would operate during both communications timing windows (or in an always-on mode) and would store and forward to the other fence circuit's devices during its respective awake interval. The bridging device would receive & transmit messages during a first communications timing window (when devices synchronized to a first electric fence are powered up and communicating). Then, during a second communications timing window (when devices synchronized to a second electric fence are powered up and communicating) the bridging device would transmit messages received during the first communications timing window, and receive new messages. Thus, messages from the two sets of synchronized devices are bridged.

A generic tag 102 may be common between all animals and potential mount 110 locations. Once an animal tag 102 is installed in a mount 110, it needs to be configured for the specific animal type and mount location. For example, the local and cloud processing algorithms may be different for a cow vs. a sheep. The motion processing for a collar worn animal tag 102 may be different than the motion processing for a leg-mounted animal tag 102. A different data transmission rate may be desirable for an animal tag 102 for a horse than the data transmission rate desired for a sheep. Rumination detection is applicable for a cow, but not for a horse, which is a non-ruminant species. In embodiments, a mount 110 may be pre-programmed with data identifying an animal type/desired animal tag 102 configuration. In embodiments, a mount 110 may be programmed with data identifying an animal type/desired animal tag 102 configuration at the time the mount 110 is attached to an animal.

Mount 110, 126 identification and association with a tag 102 (and related tag 102 configuration) may be performed once upon attachment of mount 110, 126 and/or installation of the tag 102 to the mount 110, 126. This may be done using a smartphone 114 or similar device which has a user interface, cloud connectivity, an exciter device to energize passive ID tags on both the mount 110, 126 and the tag 102, and the ability to read the tag 102 and mount 110 passive IDs. The following references to smart phones are not meant to be limiting and encompass any device similar to that described above.

Upon installation of the tag 102 to the mount 110, 126 the RFID antennas of each are positioned such that both antennas will be in range such that they may be read simultaneously by an exciter device such as a smart phone. In embodiments, this may be done before the mount 110 is initially attached to the animal. In embodiments, this may be done after the mount 110 is attached to an animal, such as when replacing a depleted tag 102.

Referring to FIGS. 4A-4D, a registration process 400 is depicted. A smart phone, or other exciter device running an animal management application, may be positioned near the mount 110, 126 and tag 102 such that IDs 204, 207, 219 for both may be read (step 402). The activation of the passive tag ID 219 on the tag 102 may cause the tag 102 to wake from a low power sleep mode (step 404). Using the mount IDs 204, 207 and tag IDs 219, the animal management application may associate the tag ID 219 and the mount ID 204, 207 (step 408) and send the associated tag ID 219 and mount ID 204, 207 to an associated user account on the remote server 122 (step 410). The association of the tag ID 219 and the mount ID 204, 207 may be automatic, or the association may be entered by a user of the animal management application or a combination thereof. The tag 102 and mounts 110, 126 may then be associated with a specific animal or object and user (step 412) and stored in the user's database (step 414) which is accessible by the animal management application. A remote server 122 in communication with the animal management application and the database may then send configuration information to the tag 102 based on the mount IDs 204, 207 (step 416). The two-step process of sending the association to a remote server 122 which then provides the configuration information to the tag 102 allows the tag 102 to be configured specifically for the animal or object to which it is attached.

Figure 4A:
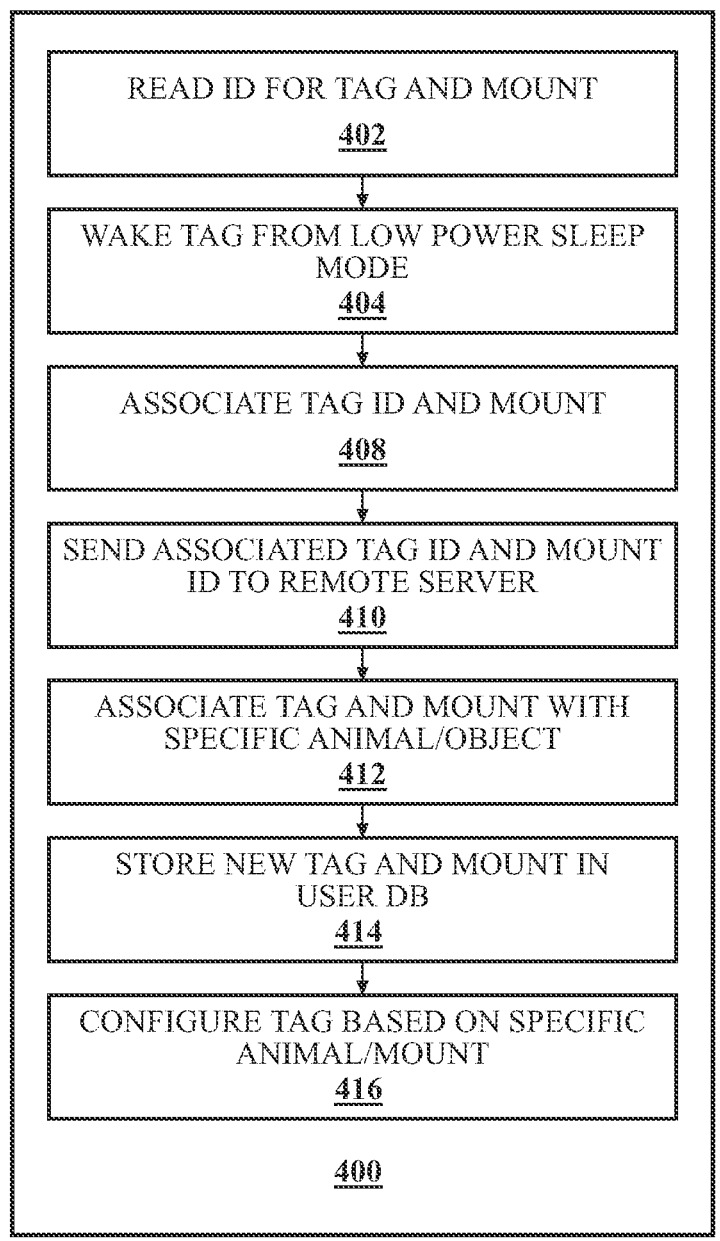
FIGS. 4A-4D depict a registration process.
Figure 4B:
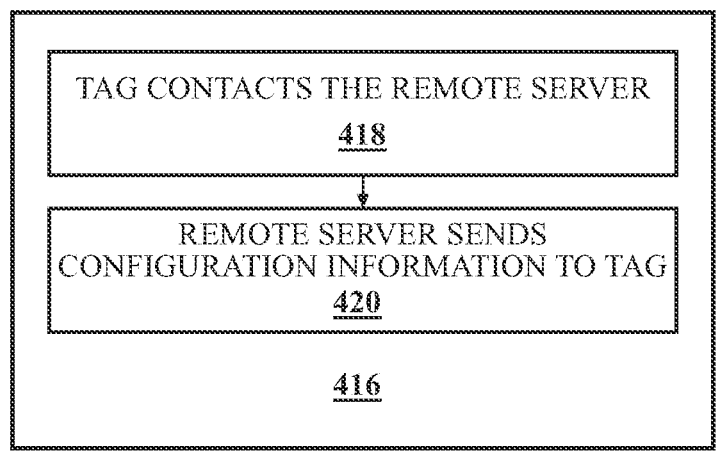

Referring to FIG. 4B, the configuration process (step 416) is depicted. An animal mount ID 204 may be unique to an animal and may include information regarding animal species, gender, status (breeding, heifer vs. cow, in-training vs. retired, mounting location, and the like. An object mount ID 207 may include information about the type of object (trough, saddle, and the like).

Upon waking up the tag 102 contacts the remote server 122 (step 418) using the active transceiver and antenna 222. The connection may be made using one or more nodes on the mesh network such as repeaters 104, gateways 108, a smartphone 114, a remote location node as described elsewhere herein, relay through other tags, and the like. In embodiments the remote server 122 sends configuration information (step 420) to the tag 102 based on information in the mount ID 204, 207. The configuration information may be sent over the mesh network, by way of a smart phone, and the like as described elsewhere herein.

The configuration information may be based on an animal type, an animal gender, an age of the animal, a weight of the animal, a feeding protocol, a medication protocol, a health status, an owner, a plan of care, and the like. The configuration may be based on an equipment type, an operator training required, a maintenance interval, an instruction manual, a point of contact, an owner, and the like. The configuration information may include sensors to activate, algorithms for processing sensed date (e.g. motion processing algorithms), data collection frequency for a sensor, thresholds for different sensor values, different parameters to sense (min, max, running average), communications intervals, and the like, so as to maximize tag 102 effectiveness while minimizing power consumption. In an illustrative example, a horse may have a different motion sensing threshold than a cow.

The tag 102 may store the sensed data and send a log of the stored data at a communications interval which may be set as part of the configuration or a default interval. In some instances, based on an algorithm, the tag 102 may identify that a threshold is crossed, a sensor is out of range, the animal is in distress, and the like, whereupon the tag 102 may communicate the data immediately or at a different frequency (e.g. more frequently if the animal is showing signs of stress).

An estimated location may be provided as part of the data communicated by the tag 102. A tag 102 may use one of several strategies for determining its location and may modify its own behavior based on the determined location, update the cloud with the determined location information, and the like. The location of the tag 102 may be determined based on proximity to a communications device 114, such as a smartphone, with a known location. The location of the tag 102 may be determined based on proximity to a beacon 120. If a sufficiently strong signal is seen from a point of interest beacon 120 the location of the beacon may be used. For example, proximity to a water trough beacon may be used to locate the animal at the water trough. When the location is based on a single known location such as a communications device 114 or beacon 120, a confidence circle, based on the signal strength between the tag 102 and the communication device 114 or beacon 120 may sent along with the location.

The tag 102 may multiliterate or triangulate based on signal strength and/or angle of arrival, respectively, for signal from at least three beacons. Calculation of location based on these methods may be performed locally on the tag 102 or the data may be sent to the remote server 122 for calculation, or the calculation of location may be performed locally and or at the remote server to different degrees of accuracy, for example based on computing resource, communications bandwidth required, or power constraints. In some instances, the tag 102 may identify signal strength or angle of arrival for repeaters and send this information to the remote server 122 for calculation of the tag 102 location. The physical geospatial location of the repeaters may be stored in the database. Additionally, the geospatial location of repeaters may be stored locally and send as part of the broadcast.

Figure 12:
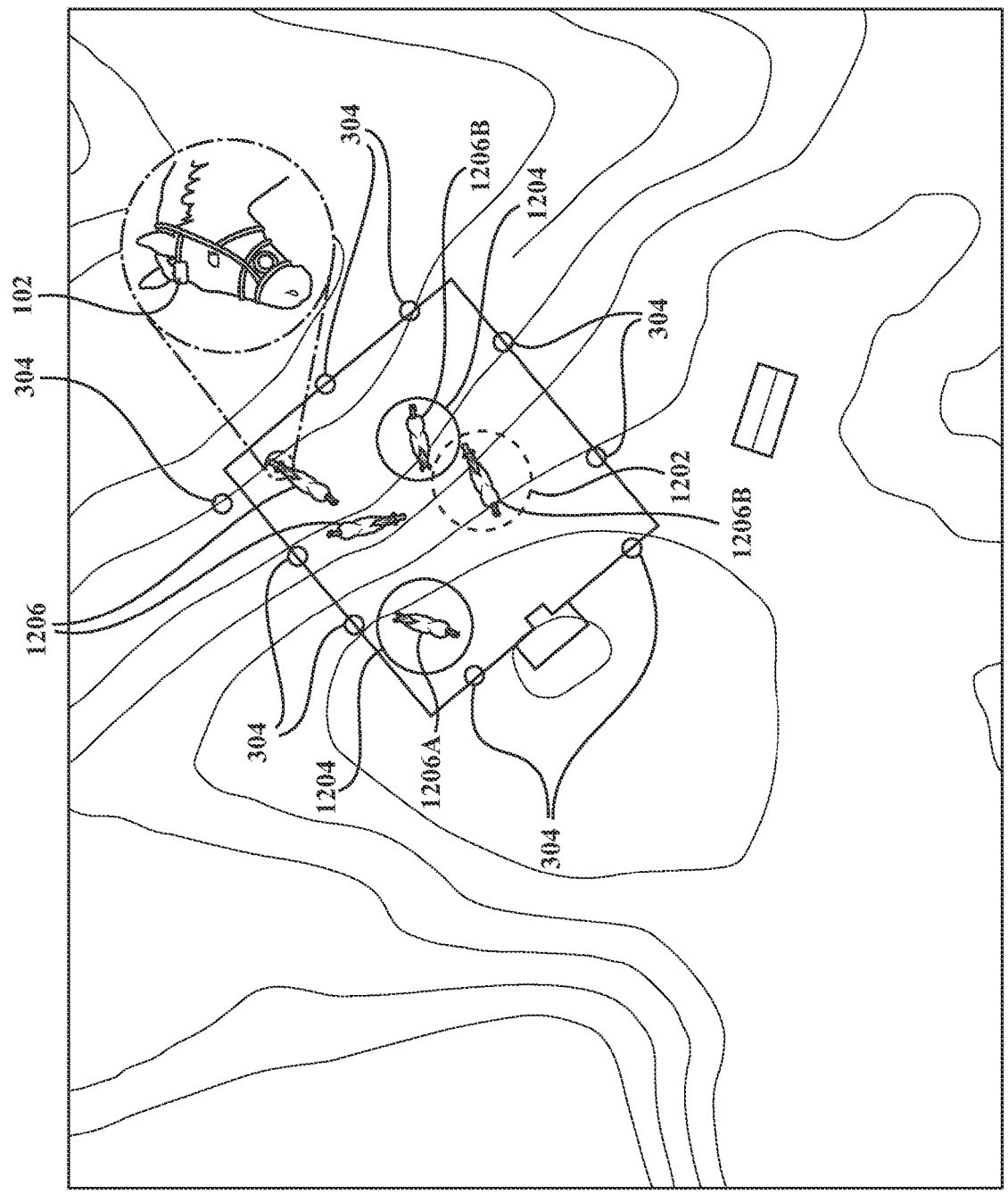
FIG. 12 depicts a system and process to locate an animal.

The estimation of location may take into account additional information such as animal and herd behavior. For example, calculating the location of an animal when its head is down (e.g. grazing) may result in high levels of uncertainty due to the RF absorption by the ground and pasture grasses impacting estimated ranges from the anchor locations. Referring to FIG. 12, in an illustrative example, anchor antennas 304 may be located approximately 2 meters off the ground along multiple fence lines. Tags 102 may be positioned on the top of a horses 1206 head (the poll) on a halter. When "idle" or chewing a horse's head will be erect 1206A and a head tag 102 would be approximately 1.5 meters off the ground. In the head erect instance, path loss generally follows a free space RF path model and the estimates may locate that horse in a relatively small area 1204. However, when grazing a horse's head will be down 1206B, resulting in the tag 102 being located approximately 0.5 meters off the ground. This results may result in the signal being significantly attenuated by the ground and pasture grasses. If the path loss is calculated using a free space RF model the performance may be significantly degraded by the unaccounted-for RF absorption from the ground and pasture grasses and the resulting estimates may locate that horse in relatively large area 1202. However, if a model that accounts for the additional RF absorption from the ground (such as by using a plane-earth (PE) path loss model, examples of which are known in the art) is used, the estimated position may be more precise with the estimate locating the in a relatively small area 1204. In some instance, depending on the horse's 1206 orientation relative to a particular anchor antenna 304 (e.g. if the horse's body is between an anchor antenna 304 and a tag 102 on the horse's lowered head), the signal may be further attenuated by the horse's body and the resulting estimate may locate the horse in a larger error or the error may be larger in the direction of the obstructed anchor 304.

Figure 4C:
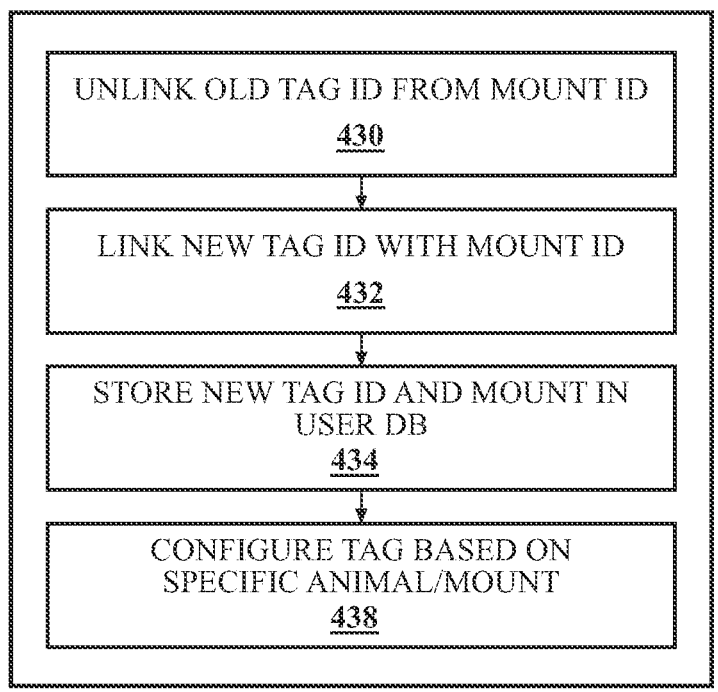

A tag 102 may be replaced when needed without the loss of historical data and without the need to remove the mount from the animal. A tag may need replacement due to battery depletion, failure, loss, damage, availability of an improved version, and the like. The current tag 102 may be removed from its mount 110, 126 and a new tag 102 attached to the mount 110, 126, and then, as described above, a smart phone or other exciter device is used to read the IDs 204, 207, 219 of the mounts 110, 126 and the tag 102. As shown in FIG. 4C, when the remote server 122 receives the information relating the mount ID 204, 207 and the new tag ID 219, the ID for the previous tag 102 is unlinked from the mount ID (step 430) in the database while the data from the old tag 102 remains associated with the mount ID 204, 207. The ID for the new tag 102 is then linked with the mount ID 204, 207 (step 432) and stored in the user database (step 434). The remote server 122 send configuration information, based on information associated with the mount ID 204, 207 to the new tag 102 (step 438). Going forward, data from the new tag 102, is stored with the data from the previous tag 102 associated with the same mount ID 204, 207 and all of the stored information may be used by the remote server 122 in evaluating the status of an animal, an object, or the like. Because the remote server 122 may already have information on the specific animal or object the configuration of the new tag 102 may be customized. For example, if the remote server 122 is aware that the specific animal to which the associated mount ID 204 is attached, for example Bessie, is at 270 days of gestation, the type and frequency of monitoring configured may be different or more frequent than a nongravid cow.

A remote server 122 may include or access one or more machine learning systems to infer a condition of an animal, including identifying animal distress, based on data from the animal's tags 102 (behavioral data and physical/vital data), location awareness, external data sources (sun, weather, and the like), herd behavior, status of farm infrastructure and the like. The machine learning system(s) may develop a model for predicting a condition of an animal using a training data set of behavioral data, vital signs, health data, locational data, herd behavior, contextual data and external sources correlated with known outcomes. Behavioral data may include grazing habits, grazing patterns, a feeding duration, a rumination, drinking habits, migration patterns, sleeping schedules, lying times, reproductive activity, congregation activities, proximity to other animals or a stationary device such as watering trough, nesting box, and the like. In embodiments, the behavioral data may be processed on the tag 102, or inferred from collected data at the remote server 122. Contextual data may be obtained from farm sensors 124, for example, temperature and humidity sensors, wind speed, and the like and external data sources such as times for sunset/sunrise, weather forecasts, moon phase, and the like. Animal behaviors and relevance of those behaviors to detection of distress may be dependent on local conditions, season, and the like. For example, a horse will typically like down (lateral or sternal recumbency) to sleep for at least a portion of each day. Provided 24-hour access to pasture during the sunny growing season, a horse will typically lie down during daytime sunny periods and graze continually at night. The cycle is typically reversed in winter. A laterally recumbent horse in a pasture on a sleeting winter day would be an indicator of distress. Other behaviors, such as not laying down when other animals are laying, may be ignored in the analysis of distress as certain animals engage in a sentinel activity, keeping watch over other resting animals.

Figure 4D:
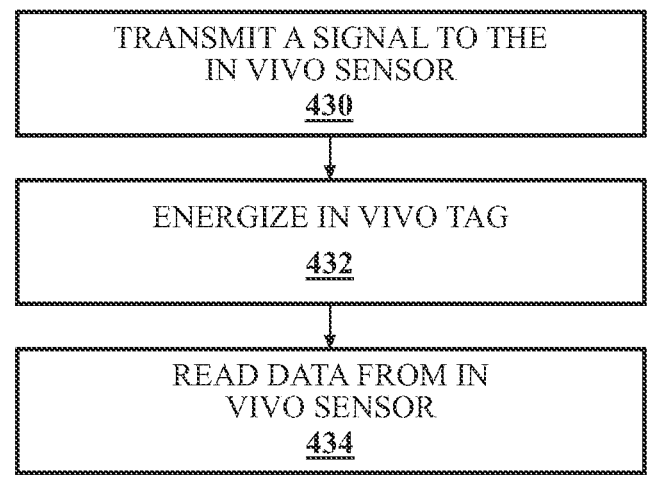

Behavioral data and health data, including vital signs and physiological parameters may be obtained from sensors, such as in vivo, implantable, or ingested sensors, as described elsewhere herein, such as including temperature, heart rate, respiration rate, glucose level, blood pressure, oxygenation, and rumen movements. In some embodiments, an in vivo sensor 128 may have an on-board power source and send data through the tag using an active transmitter. In some embodiments, as shown in FIG. 4D, an in vivo sensor 128 may be passive (without its own power source and/or active transmitter). An external sensor tag 102 may transmit a signal to an in vivo sensor 128 (step 430) using short range frequencies (120-140 kHz) such as might penetrate the animal to connect with the in vivo sensor 128. This may energize the in vivo sensor 128 (step 432) and read the in vivo data (step 434). The in vivo sensor 128 may be read using short range frequencies such as might penetrate the animal to connect with the in vivo sensor 128. In some cases, vital signs may be inferred using non-invasive sensors to detect bodily functions such as urination, respiration, lactation, a bowel movement, passing gas, a body measurement, a calving activity, and the like, all of which may be indicators of health. In an illustrative and non-limiting example, a non-invasive sensor may detect CH4 or H2S, which would indicate that an animal is passing gas. Lack of a CH4 or H2S may indicate a possible bowel obstruction. In an illustrative and non-limiting example, a non-invasive audible sensor may detect normal gut sounds and alert to a possible obstruction when such sounds cease.

Figure 11:
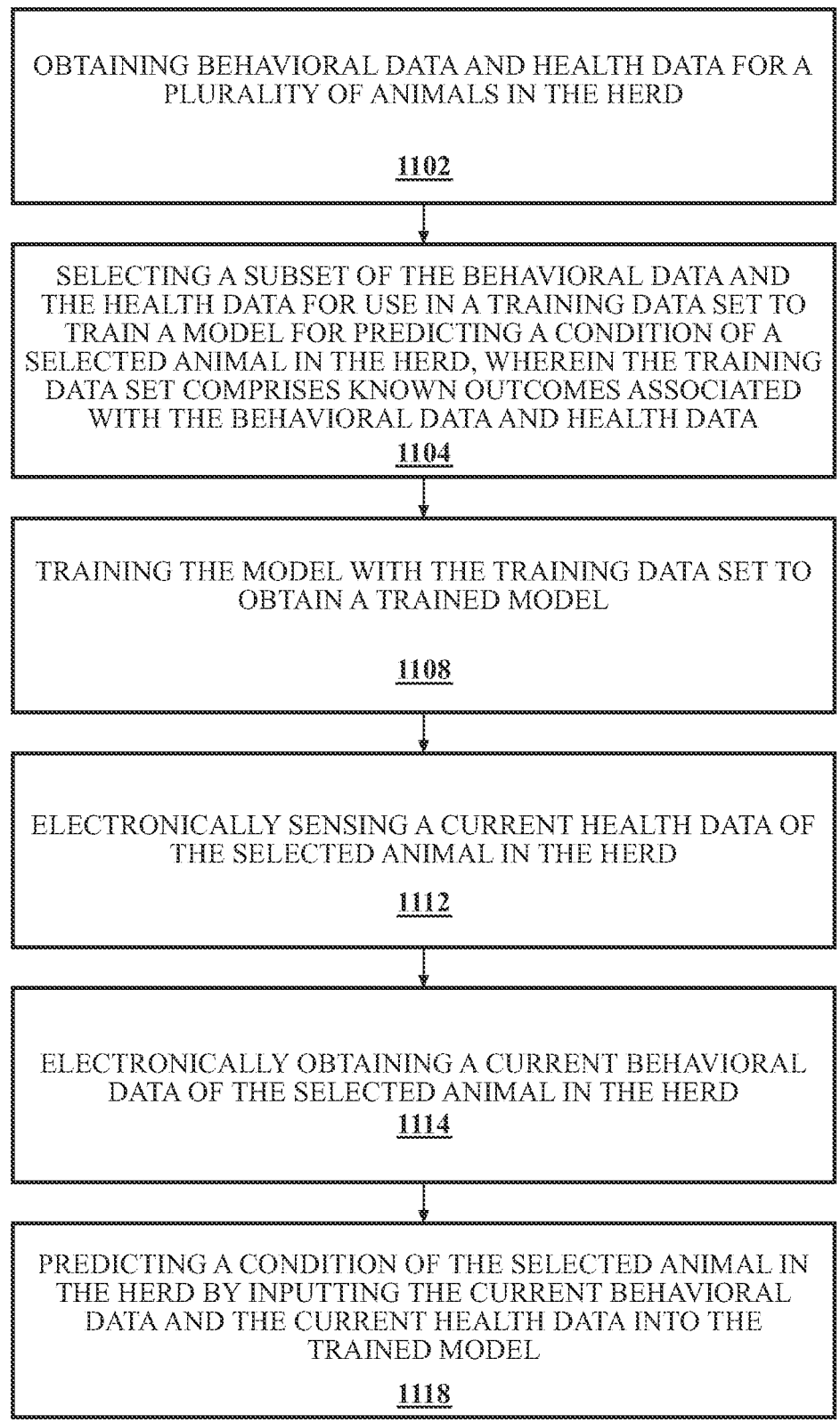
FIG. 11 depicts a process to infer a condition of an animal in a herd.

In embodiments, an initial training data set may be based on third party data or historical data. Referring to FIG. 11, in embodiments, the system may obtain behavioral and health data for a plurality of animals in a herd (step 1102) and select a subset of the behavioral data and health data and known outcomes (step 1104) for use in training a model to predict a condition of a selected animal in the herd (step 1108). The training set may be revised based on data obtained for the particular site and assets (animals and farm equipment). After training the model, a trained machine learning model may comprise one or more algorithms such as linear regression algorithms, regularized linear regression algorithms, decision tree algorithms and subtypes of any of the algorithms thereof. The trained model may then be able to predict a condition of a selected animal in the herd based on health and behavioral data for that animal. In embodiments the trained model may be tested to validate the model using a new set of testing data based on known outcomes and behavioral and health data obtained from the herd. In embodiments, a training set may further include environmental data and known outcomes associated with the environmental data. The trained model may use current environmental data together with the current health and behavioral data to predict a condition of a selected animal. Environmental data may include a temperature, a humidity, a precipitation, a pollen count, an air quality, a weather event, a season, a sunrise, a sunset, or a solar irradiation, and the like. In embodiments, a training set may further include contextual data and known outcomes associated with the contextual data. The trained model may use recent contextual data together with the recent health and behavioral data to predict a condition of a selected animal. Contextual data may include a location or a path the animal is on or has traversed. In embodiments, the behavioral data and current behavioral data may relate to a whole herd behavior such as a whole herd respiration rate, and the like which may be averaged or normalized.

The machine learning model may accessible from a user interface on a smart phone 114, remote server 122, or other device using an API. The user interface may enable a user to identify groups of correlated animals whose data might be used as input in the determination of a given animal's condition. In embodiments, a user may indicate members of a herd having similar characteristics (age, gender, common recent events, and the like). In embodiments, the machine learning model may identify appropriate "herd" members based on determined proximity between at least two animals and at least one of (i) the data of the physiological parameter of the first animal, (ii) the data of the behavioral parameter of the first animal, (iii) the data of the physiological parameter of the second animal, or (iv) the data of the behavioral parameter of the second animal. In embodiments, the machine learning model may identify appropriate "herd" members based on common characteristics, location, and the like. For animals which are members of the same herd, the remote server 122 and/or the machine learning model may calculate whole herd behavior parameters such as an a whole herd respiration rate, an average respiration rate of the whole herd, averages over the herd of the individual behavioral data of herd members such as a grazing habit, a grazing pattern, a feeding duration, a rumination, a drinking habit, a migration pattern, a sleeping schedule, a lying time, a reproductive activity, a congregation activity, or a proximity to another animal, other herd members and/or a stationary device. For example, if all but one of a herd's members are grazing and have respiration rates within one standard deviation of the mean. If the one member of the herd's motion also indicates grazing (not running), yet their respiration is two standard deviations above the mean for the herd, this herd member may be at a greater risk of distress.

A remote server 122 may receive data from a plurality of tags 102, farm sensors 124, actuators 112, and the like via a gateway 108, a communications device 114, a repeater 104 an actuator 112, and the like. The remote server 122 may model behavior in relationship to the timing of farm workflow (e.g., 1 hour after feeding). The remote server 122 uses the model on current behavioral and health data of the individual animal and the herd to identify a present state, a future state, trends, and the like. The model may also include contextual data including environmental data such as one or more of a temperature, a humidity, a precipitation, a pollen count, an air quality, a weather event, a season, a sunrise, a sunset, a phase of the moon cycle, a solar irradiation, and the like. The environmental data may include current data obtained from farm sensors or from third parties. The environmental data may include forecast data such as storm warnings, heat waves, extreme cold, and the like. Based on the analysis, the remote server 122 may initiate an action with an actuator 112, alert a farmer or trainer, and the like as described herein.

In an illustrative example, farm animals tend to follow fixed routines and the remote server 122 may use machine intelligence to identify these trends such as learning characteristic path patterns for a herd and/or individual animals. For example, sudden departure of the herd's grazing pattern from recent history could indicate presence of a predator. A female deliberately staying apart from the group may be ready to give birth.

In an illustrative example, a first sensor tag 102 associated with a first farm animal may provide physiological data about the first farm animal in a herd and a second sensor tag 102 may provide behavioral data about the first farm animal. A second farm animal, in the same herd as the first farm animal, may have a third and fourth sensor tag 102 providing physiological and behavioral data about the second farm animal. The data from the first and second farm animals may be collected contemporaneously or may be collected asynchronously. The remote server 122 may use the physiological and behavioral data from both the first and second farm animals, in addition to other data described elsewhere herein, such as contextual or observational data, to determine whether the first farm animal is distressed.

In embodiments, predications from a remote server 122 may be used to update a status display, or status data for a particular animal or object. In embodiments, a predication, a status, or a health risk assessment may result in an alert or notification to a farmer, using an application, text message, and the like on a communication device 114. In embodiments, predications, a status, or a health risk assessment from a remote server may result in commands to actuators (refill trough, turn on ventilation fan or heater), updates to beacons, updates to tag instructions (e.g. change in reporting frequency), and the like. It may be possible for a farmer to specify how and under what conditions in which an alert or notification should be sent or an action performed. For example, if a health risk increases, a sensing and/or reporting frequency and/or a broadcast power for a sensor tag 102 (either associated with that animal or associated with another animal in the herd) may be increased. If the level health risk decreases, a sensing and/or reporting frequency and/or a broadcast power may be decreased to extend sensor tag 102 life. The remote server 122 may send commands to effect the change using the ad hoc mesh network, a mobile device, and the like.

Figure 5:
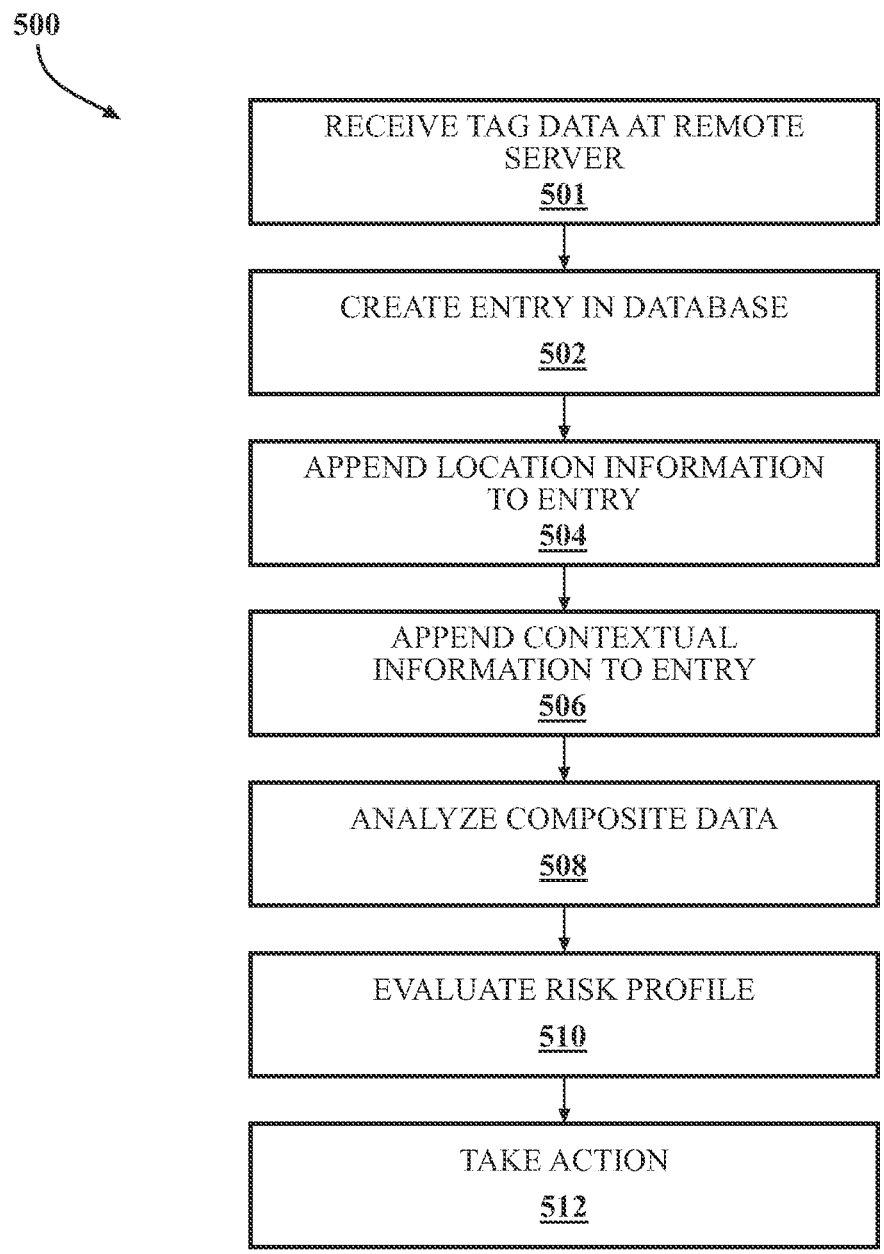
FIG. 5 depicts a process for identifying an animal's status.

Referring to FIG. 5, upon receipt at the remote server 122 of data from a sensor tag 102 (step 501), an entry may be created in a database 130 (step 502) documenting data. Creation of the entry may include re-synchronizing individual data entries transmitted in a batch to the actual time of each measurement. Contextual information such as location information may be appended to the recently created entry (step 504). Location information may be part of the received data or determined at the remote server 122 as disclosed elsewhere herein. In embodiments, additional contextual data may be associated with the entry (step 506). The additional contextual information may include external environmental data, the identification of nearby animals, the identification of nearby objects (e.g. trough), and the like. In embodiments, a farmer, worker or other observer may use the application 306 to add observational entries into an animal's record directly. For example, with horses, a user may be able to select observed behavior from options such as "biting side", "eating", "lying down" and the like. This observational data may be stored with the other entries associated with an animal and used for future analysis.

For an animal, data from farm sensors may be associated with an animal entry based on proximity to the sensor (e.g. change in water level may be associated with a nearby animal), status of farm infrastructure in proximity to an animal, state of equipment (fans, etc.), position of gates and doors, occupancy detectors, ambient light levels, noise, and the like. Essentially, data regarding anything that could affect the behavior of the animals or contribute to modelling for the development and verification of behavior tracking algorithms, and the like. Data from external sources may include current and predicted information regarding weather, temperature, humidity, heat index, cold index, storms, tornados, sunrise, sunset, and the like.

The remote server 122 may proceed to analyze the composite data (step 508) including animal species and location of tag(s) on the animal, the animal's current location (e.g. in the barn, in a field, on a trailer, and the like), time of day, weather, and the like. The remote server 122 may use the analyzed data together with recent past behaviors, path tracking compared with other nearby animals of the same species and with historic data from the same animal to evaluate an overall risk profile (step 510) for the given animal. based on. Based on the results of the risk analysis, the remote server may then take an action (step 512).

If an animal is determined to be at risk as a result of the risk analysis, an alert may be pushed to a remote communication device such as a farmer's mobile phone based on the specific animal, class of animal and application specific rules. For example, if recent events and behaviors for a specific animal correlate with the known symptoms of a common or previously identified ailment, an alert may be sent providing the identification and location of the animal, the suspected ailment(s), and a list of the behaviors or events on which the alert was based.

In embodiments, the results of the risk analysis may be used to tailor a rate of energy consumption by tag(s) 102 associated with the animal. In an illustrative example, a risk analysis indicating a change in level of risk may result in sensor tag(s) 102 being reconfigured to change a sensor sensitivity, a sampling frequency, a reporting frequency, a needed location fidelity, a transmitting power, and the like. In an illustrative example, if the risk analysis indicates an elevated level of risk associated with the animal, one or more sensor tag(s) 102 may be reconfigured to increase one or more of: sensor sensitivity, a sampling frequency or measurement interval, a reporting frequency or communication interval, a needed location fidelity, a transmitting power, and the like, the need to monitor the animal more closely justifying the increased battery drain. In another example, if the risk analysis shows that the animal is generally healthy and the level of risk is low, the tag(s) 102 may be reconfigured to extend battery life, such as by decreasing sensor sensitivity, decreasing sampling frequency, decreasing needed location fidelity, decreasing reporting frequency, decreasing transmitting power, and the like.

Figure 10:
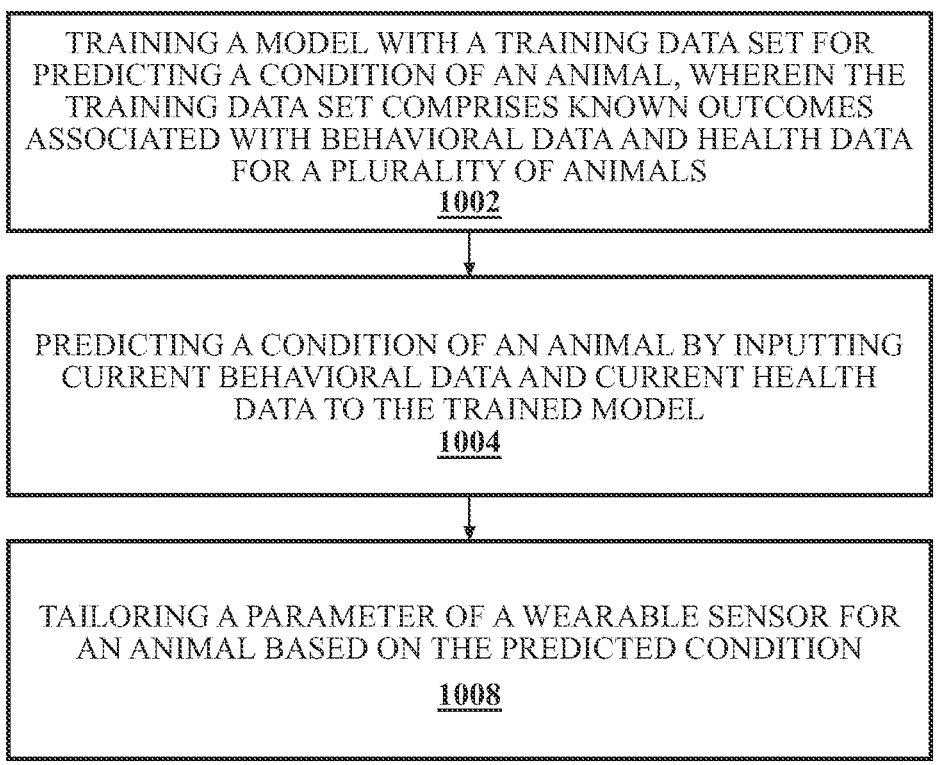
FIG. 10 depicts a process to conserve a wearable sensor's power.

The need to monitor the animal more closely may be based on a trained model to predict a condition of an animal. Referring to FIG. 10, the model may be trained with a training set having known outcomes associated with behavioral data and health data for a plurality of animals (step 1002). The trained model may then predict a condition of an animal based on input of current behavioral and health data of the animal (step 1004) and determine a level of risk associated with the animal. Based in part on the predicted condition and the level of risk, one or more sensor tag(s) 102 parameters may be tailored or reconfigured (step 1008) to change one or more of: a sensor sensitivity, a sampling frequency or measurement interval, a reporting frequency or communication interval, a needed location fidelity, a transmitting power, and the like.

In embodiments the changes to the configuration may include a scheduling element such as increasing reporting frequency at night and decreasing reporting frequency during the day when the farmer or other workers may be about. In embodiments, changes to one or more of: sensor sensitivity, a sampling frequency or measurement interval, a reporting frequency or communication interval, a needed location fidelity, a transmitting power, and the like may be based on at least one of a predicted wearable sensor battery life, a mesh network performance or received signal strength of the wearable sensor. In embodiments, changes to one or more of: sensor sensitivity, a sampling frequency or measurement interval, a reporting frequency or communication interval, a needed location fidelity, a transmitting power, and the like may be based on proximity of the animal to a point of interest or proximity to a suspected break in containment. In embodiments, changes to one or more of: sensor sensitivity, a sampling frequency or measurement interval, a reporting frequency or communication interval, a needed location fidelity, a transmitting power, and the like may be based on at least one of: a desire to activate an actuator in proximity to the animal wearing the sensor, a change in the status of an animal (e.g. before/after birthing) or a suspected breach in containment.

The reconfiguration instructions to the tag(s) may be provided by a mobile device in electronic communication with a sensor tag 102 associated with the animal and the one or more sensor(s) 214 of the sensor tag 102 and/or an in vivo sensor 128 communicating through the sensor tag 102.

A tag 102 may use one of several strategies for determining its location, and may modify its behavior based on the identified location and/or update the remote server 122 with its location information. The tag 102 may identify currently available methods for determining location such as 1) proximity to a smartphone 114 with known location, 2) proximity to a fixed location beacon 120 (i.e., a Bluetooth beacon), 3) proximity to another tag 102 (animal or object) which has a high confidence in its own location, or 4) by triangulating from a set of at least three location anchors 602 at known locations. Each method poses a different burden on battery life, so, under certain circumstances as elsewhere, a tag 102 may choose to accept a lower fidelity locating method to conserve battery life. Other factors may be used in selecting which method to use including a time since the radio device was last located, a confidence in the location of the radio device, a current condition of the animal bearing the radio device, or a time of day.

Figure 6:
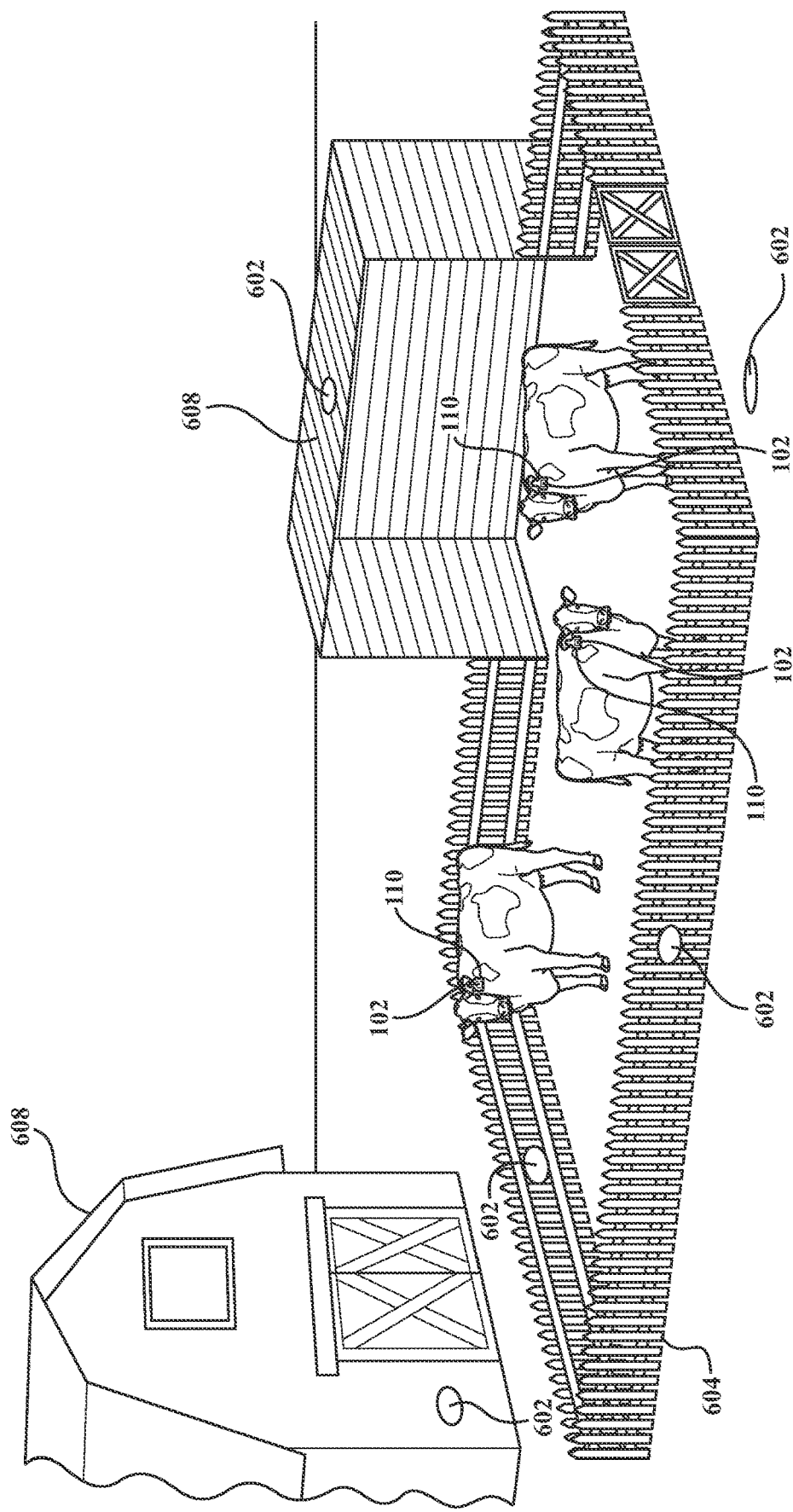
FIG. 6 depicts an environment in which an animal may determine its location.

Referring to FIG. 6, in some circumstances, a mathematical process called multilateration or trilateration may be used to estimate location using the signal strength from three or more wireless transmitters at known locations, called anchors 602. These anchors may be beacons 120, repeaters 104, or gateways 108 located on fences 604 or buildings 606. To determine a location, a tag 102 may listen for signals from the anchors 602 and record at least one of the signal strength or the angle for each anchor 602 it sees. For multilateration or trilateration to work, a given animal tag must be able to hear transmissions from at least three anchors, however if more anchors are seen, this information can be used to improve the accuracy of the location estimate. In embodiments, the tag 102 forwards signal strength data, angle of arrival, or both for all of the anchors 602 identified. The trilateration routine running on the remote server 122 performs the location estimation given the relative locations of the anchors and the signal strength, angle of arrival, or both. In embodiments, a tag 102 may have some knowledge, even at a relatively lower fidelity, regarding approximate anchor 602 locations and the tag 102 may choose to transmit information about only a subset of the anchors 602 seen, to reduce data transmitted and power use.

Because errors may accumulate the further away a given anchor 602 is from tag 102 being located, preference may be given to signal strength in selecting the three anchors 602 and in the weighting of different anchors 602 in the model. Additionally, the relative angles of arrival or known coordinates of anchors may be used in selecting anchors 602 to provide a distributed group which bounds the location of the tag Triangulation and multilateration accuracy and stability may be affected by a large number of variables. It may require some level of de-noising (filtering) prior to presenting to a user. Animals often exhibit characteristic gates, tracks of movement, finite limits on instantaneous acceleration, and biological limits to their motion which can be incorporated into animal and even species-specific location smoothing.

Location smoothing can also be enhanced by augmenting trilateration with some information from other sensors (either on the tag 102, in-vivo, on the animal, or external), including inertial sensors, magnetic field, atmospheric pressure, etc. For example, the magnetic vector (heading) between two moments in time may be forwarded by the to the cloud and fused with the trilateration result to nudge the predicted location in the right direction, even if, for example, certainty is low. For example, an accelerometer, barometer, or the like may be used to determine whether an animal's head is up or down. This may be taken into consideration when determining location as described elsewhere herein.

In embodiments, a tag 102 may use a beacon 120 to identify points of interest on the farm (e.g., water trough). If a sufficiently-strong signal is seen from a beacon 120, there is no need to perform trilateration and the beacon 120 location is used as the tag 102 location.

In embodiments where no infrastructure is present and tags 102 are using one or more smartphone(s) 114 to communicate with the remote server 122, the only location information available is the smartphone's location (presumably known and appended to the data when transmitted) and a confidence circle, based on the signal strength between the tag and smartphone.

In terms of power required for each locating approach, the use of the smartphone(s) 114 location requires none, the identification of a beacon 120 require a small amount of power to scan for the beacon (~500 milliseconds), trilateration requires the most power as it has to scan for multiple anchors (~5-10 seconds) 602 and send the signal data for each anchor 602 to the remote server 122. In embodiments, location accuracy may be improved with some combination of the three methods. Given advances in processors, it may be more power efficient to perform trilateration locally on the tag 102 if it enables a reduction in the data to be sent wirelessly. In some cases, running even a low-fidelity version of the location routine locally can allow the sensor to more intelligently choose which data to send and which to discard. Depending on the length of time since the tag 102 was last located, or the remote server's 122 confidence in a tag's 102 location, a given tag 102 may be configured or intelligently decide which methods should be used and at what update rate. The location method and rate may also be adjusted based on the urgency of the animal's current condition, time of day, etc. to conserve power or bandwidth.

The tag 102 may also ascertain its location relative to other animals (who may be identified using their tag ID 419) and use this knowledge to establish herd membership (e.g. I am by cow 121) or use collective results and possibly machine learning, to infer and proactively correct for signal impairments due to other herd members passing between a tag 102 and on or more locating beacons 120, repeaters 103 and gateways 108 that could be corrected for on remote server 122

Being made mostly of water, animals are excellent absorbers of RF energy. If another animal is standing between the animal being located and the anchor, the signal strength may be severely attenuated, skewing the result. Because the cloud has location information on estimated location of all sensor tags 102 (animals) in the vicinity, the multilateration calculation can incorporate adjustments to counteract this signal impairment and improve accuracy. Signal strength to other animals, while not fixed anchors, can also be used in a multilateration calculation to calculate a location when less than two anchors are in range, or through iterative approaches be used to refine locations by substituting a series of estimated other-animal locations and signal strengths and identifying locations with strong correlations between successive calculations. In an illustrative and non-limiting example, a sensor tag 102 may identify a proximity of a first radio device associated with a first asset (animal) to a second sensor tag 102 associated with a second asset (animal) which has a high confidence in its own location and estimate, based on the proximity and the location of the second sensor tag 102 and a partial location estimate for the first animal (first sensor tag 102) using two or more fixed location beacons 120, that the second asset (animal) is obstructing a signal between the first sensor tag 102 and other radio nodes such as a fixed location beacon 120, a repeater 104, a gateway 108, and the like. The remote server 122 may determine the transmission impairment of the first sensor tag 102 based on a location, position or behavioral parameter of the second animal. In embodiments, based on the determined transmission impairment, the remote server may generate and transmit instructions to modify transmission characteristics of the mesh network. These instructions may include instructions to one or more sensor tags 102 on the first animal, instructions to one or more sensor tags 102 associate with the second animal or other animals in the herd, instructions to nearby beacons 120, repeaters 104 and gateways 108, and the like. The instructions may include modifying a transmission rate, modifying a power of a signal transmitted by at least one of the sensor tags 102, modifying how anchors are weighted for a location calculation, and the like.

In embodiments, based on the determined transmission impairment, a location of the first radio device may be multilaterated from a set of at least two location anchors at known locations and a signal strength of the second sensor tag 102 which has a high confidence in its own location. In embodiments, a refined multilateration calculation for the first radio device may include substituting a series of corrected signal strengths for the obstructed fixed location beacon 120, and identifying the location of the first radio device by a strong correlation between the revised estimated location of the first radio device and the proximity of the second radio device.

In embodiments, the correction factor for calculating corrected signal strength may be based in part on data regarding the posture of the first animal. For example, if the first animal has its head down (grazing) when another animal is positioned between it and the obstructed beacon, the impairment will be greater than if its head was erect. In embodiments, the correction factor for calculating corrected signal strength may be based in part on data regarding the posture or orientation of the second animal with respect to the path between the first animal and the obstructed beacon. For example, a perpendicular orientation may result in a larger portion of the mass of the second animal being positioned between the first animal and the obstructed beacon compared with a parallel or oblique orientation.

For example, the presence of a signal from an adjacent animal suggests there may be a 10 m separation between animals. In the example, a cow between one animal, 10 m away, and a beacon may cause a 3 dB drop in signal. Thus, 3 dB may be subtracted from one of the beacon signals and the estimated location may be re-computed. This process may be repeated for each beacon. It is then determined which recomputed locations happen to place the animal 10 m+/− from the adjacent animal and that location result is used going forward.

In embodiments, upon identifying an obstruction based on one or more animals, the application 306 may update a graphical representation of the mesh network with a representation of the obstruction.

In some embodiments, the method used to determine location of a radio node may be selected based on one or more factors. Method may include determining a proximity to a smartphone with a known location, determining a proximity to a fixed location beacon, determining a proximity to another radio device which has a high confidence in its own location, and/or multilaterating/triangulating from a set of at least three location anchors at known locations. In embodiments, the location may be determined using more than one method to provide increase confidence in the determined location. In embodiments, the method selected may be based on one or more of a time since the radio device was last located, a confidence in the location of the radio device, a current condition of the animal bearing the radio device, or a time of day.

Each locating method has the ability to determine a relative confidence in the given location result. The confidence level may be used to graphically depict a range of possible locations to the end user. In embodiments, the relative confidence of different methods of location may be fed back to the system (including the tag 102) to cause it to adjust, for future location computations, based on the relative confidences, an energy expended for one or more of: determining a proximity to one or more of a smartphone with a known location, a fixed location beacon or another tag 102 with high confidence in its own location or triangulating the location.

If a tag 102 is running even a rudimentary multilateration or triangulation routine, it may be able to determine when its computed location places the tag and associated animal outside the boundary of a fence line or outside a building. If this animal is assigned to the given field or building it now outside, this may trigger the tag 102 to expend additional energy in subsequent location attempts, change (increase or decrease) a frequency of location updates, or even activate an emergency locating system like GPS.

Maybe even more valuable than absolute location is path awareness. Path tracking builds on location determination but uses machine learning to identify and store characteristic patterns for a herd and/or individual animals. Farm animals follow fixed routines. For example, sudden departure of the herd's grazing pattern from recent history could indicate presence of a predator. A female deliberately staying apart from the group may be ready to give birth.

The system may also provide monitoring and documentation in a compliance log of farm workflow and compliance with regulations based on animal behavior. Farms rely on significant amounts of manual labor and hiring employees and training them to correctly and consistently perform animal care tasks may be difficult. The farmer may not always be on site and yet still want to verify animal case such as: animals being turned out to pasture at appropriate times, animals being fed and water at correct times, an animal receiving correct medication if needed, horses being blanketed in inclement weather, animal quarantines being maintained, and the like. The farmer may also have concerns about equipment and infrastructure such as whether the barn is adequately ventilated, are the lights coming on at appropriate times, is the automatic feeder working, is waste or theft occurring, and the like. The farmer may also wish to track equipment such as saddles, tractors and the like and assure that they are not being ill-used (e.g. left out in the weather, and the like). While this type of tracking might be achieved using an extensive system of sensors and/or cameras on all of the animals and equipment is would be expensive, potentially unreliable and require large amounts of bandwidth. Alternately, tags 102 on animals and equipment may: provide sufficient data to: verify compliance with instructions regarding animal care; help locate equipment and accessories; assure that accessories (blankets, fly masks, harnesses, and the like) are on the correct animal; reduce theft; provide historic record of an animals care (feeding, watering, pasture time, quarantine history, and the like) to demonstrate compliance with animal regulations and defend against false charges of animal cruelty; proactively order supplies and implement repairs, and the like.

Sensor tags 102 may provide data such as animal location, behavioral data, physiologic data, or positional information regarding an animal or herd of animals from which the remote server may be able to infer a workflow event. The farmer may be able to enter, using a user interface of the application, a series of workflow rules documenting such things as what data should be logged in a compliance log, what inferred events should be logged in a compliance, under what conditions should an alert be issued, under what conditions should an action be initiated. The workflow rule relates to at least one of a stabling, a pasturing, a herding, a sheltering, a feeding, a medicating, a provision of water, a manure and/or wastewater removal, an inspection interval, a records management, or a feed storage.

In an illustrative example, feed pans containing beacons 120 may include sensors and thus be able to confirm feed is delivered to the correct stall/feeder. In an illustrative example, when the data indicates the location of one or more animals in a field, an inferred workflow event may be that a particular gate was opened. In another example, when the sensor data indicates that one or more animals are congregating near other animals and the one or more animals have their heads down, an inferred workflow event may be that the one or more animals were fed. In another example, when the sensor data indicates that one or more animals are near a feed pan containing a beacon, an inferred workflow event is that a correct food or medication was delivered to the one or more animals. The workflow events inferred from the location, behavior or position of one or more animals may be used to determine compliance with a workflow rule. Workflow events may relate to one or more of a stabling, a pasturing, a herding, a sheltering, a feeding, a medicating, a provision of water, a manure and/or wastewater removal, an inspection interval, a records management, or a feed storage.

Sensor tags 102 may provide data such as animal location, behavioral data, physiologic data, or positional information regarding an animal or herd of animals from which the remote server may be able to identify a workflow event that should be triggered. For example, feeders may drop correct food and/or medication based on an identity of a specific animal detected near the feeder/waterer and the animal's specific status. For example, an animal not drinking may be delivered a small portion of desirable feed dusted with salt and/or electrolytes to promote thirst and encourage drinking. Additionally, data regarding the timing and amount of food and/or water provided to a specific animal may be used to infer a condition of an animal.

In some embodiments, a tag 102 may also act as a repeater 104 to relay information received from other sources such as other tag(s) 102, in vivo sensor(s) 128, and the like to the remote server using the mesh network described elsewhere herein.

Because of their low cost and unobtrusive nature, some applications may use multiple tags 102 on a single animal (e.g. at tag 102 on the ear and a tag 102 on the ankle) where each tag 102 may be configured to have a specific sensing objective based on the associated mount 110. By allocating the work each tags 102 may provide optimal performance. An ankle tag 102 motion sensor no longer needs to detect chewing, and may use lower sensitivity and sample rates to save power. Because the ankle tag 102 is close to the ground, it may experience worse RF signal impairment (ground absorption). However, by detecting its presence on an animal having an ear tag 102 (either using local detection methods or via information retrieved from the cloud), the ankle tag 102 may choose to forward data (using a lower power transmission) to the ear tag 102 and request the ear tag 102 to relay the data from the ankle tag 102 to the cloud 118 and remote server 122.

Figure 8:
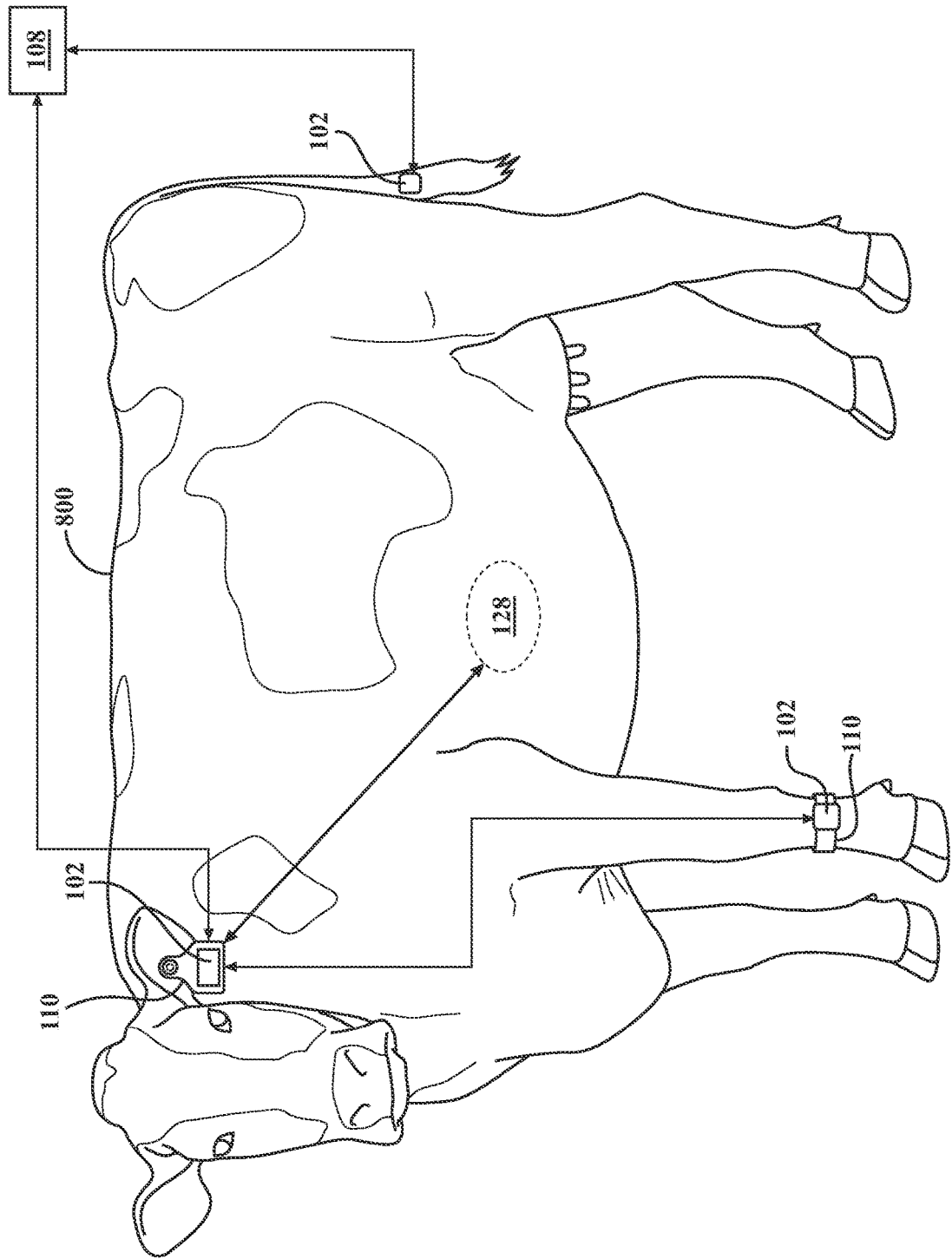
FIG. 8 depicts a tag 102 acting as a repeater.

Referring to FIG. 8, a tag 102 acting as repeater is depicted. An animal 800 may have one or more mounts 110 with tags 102 as well as one or more in vivo sensor(s) 128. An in vivo sensor 128 may be implanted or inserted into the animal or ingested by the animal. It may be difficult for an in vivo sensor 128 to transmit data any distance and if a battery fails it is difficult to replace. In some embodiments, an in vivo sensor(s) 128 may have an on-board power source and send data through an external sensor tag 102 using an active transmitter. In some embodiments, an in vivo sensor(s) 128 may be passive (without its own power source and/or active transmitter) and act as a parasite on the external sensor tag's power. An external sensor tag 102 may transmit a signal to the in vivo sensor 128 using short range, low frequencies (for example 120 kHz-140 kHz) such as might penetrate the animal to connect with the in vivo sensor 128. This may energize the in vivo sensor 128 and allow the vivo data to be read. The external sensor tag 102 may then forward the data to the remote server 122. The external sensor tag 102 may forward configuration information from the remote server 122 to the in vivo sensor 128.

The in vivo sensor 128 may be read using short range frequencies such as might penetrate the animal to connect with the in vivo sensor 128. In embodiments, the external sensor tag 102 may be associated with the same animal having the in vivo sensor 128 or a different animal.

Figure 7A:
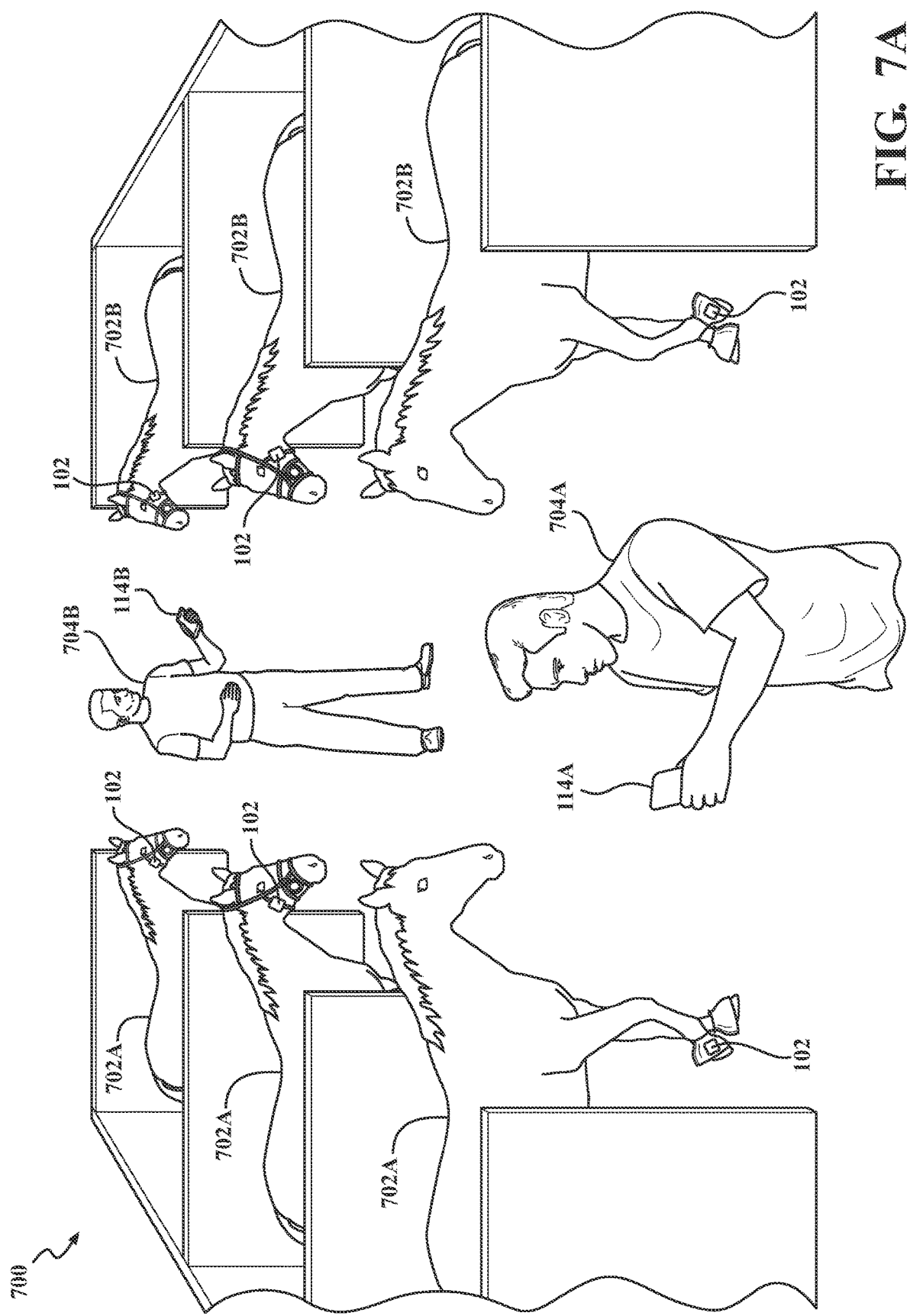
FIGS. 7A-7B depict an ad-hoc mesh network supported by smart phones.

The use of common communication technology and a mesh network for communication between the tag 102 and the remote server 122 may allow for the creation of an ad-hoc mesh network using smart-phones running a communication application. An ad-hoc mesh network using smart-phones may be particularly useful in places the farmer (or animal owner) doesn't directly control such as a horse boarding stable, a county fair, an animal show, a horse race, and the like. While an individual farmer (or animal owner) may not control the environment, there may be a number of similarly situated animal owners/farmers present in these locations. In these communal environments, the use of their collective smart phones, each having the disclosed application installed, will create a temporary mesh network to provide cloud connectivity for all of them. Referring to FIG. 7A, in an illustrative example, a stable 700 in a remote location houses multiple horses 702A, 702B having different owners 704A, 704B. Each horse 702A, 702B has at least one associated tag 102. As the owners 704A, 704B move around the stable 700, their smart phones 114A, 114B will provide a connection to the remote server 122 for tags 102A, 102B associated with horses 702A, 702B owned by either owner 704A, 704B.

Figure 7B:
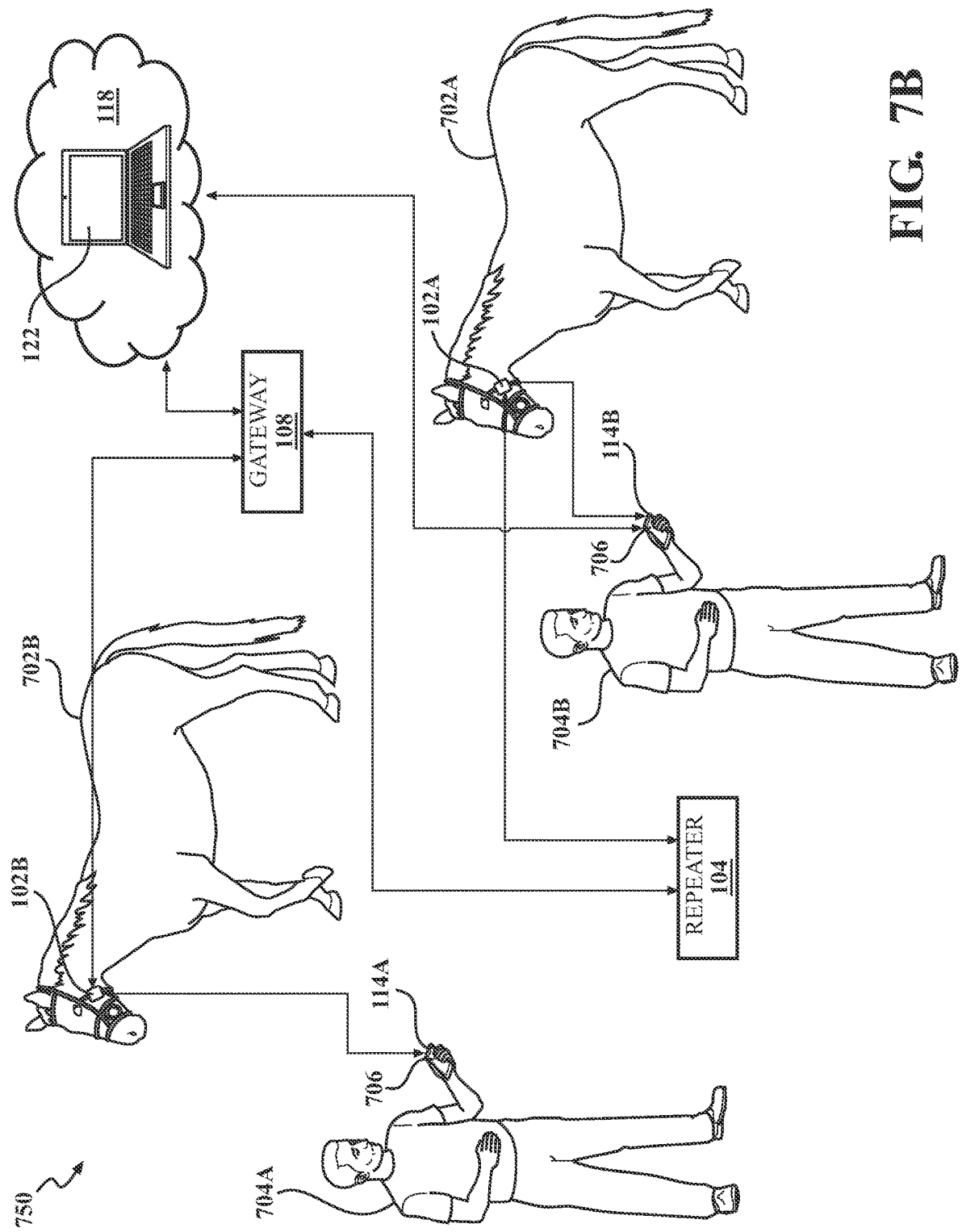

A communication platform may forward data from a tag 102 to a remote server 122 in the cloud where the data may be processed as described elsewhere and turned into alerts. In this role, the ad-hoc network does not need to know anything about the tag 102, its data, or the associated account. Referring to FIG. 7B, a temporary communication platform 750 comprising a plurality of device nodes is shown. Each device node has a radio compatible with that found in the tag 102 and access to the cloud 118 and remote server 122. Device nodes include a plurality of smart phones 114A, 114B associated with different owners 704A, 704B running a forwarding application 706, possible gateways 108 having an internet connection (e.g. WiFi, LAN, cellular, SAT, etc.), possible repeaters 104 accessing the network through an alternate network, and other tags 102. As a tag 102 has new information to send, it searches for device nodes on the temporary communications platform, such as a gateway 108, a repeater 104, a smart phone 114 running the forwarding application 706, and the like. Once the tag 102 has identified one or more device nodes capable of forwarding the data, the tag 102 select a device node to complete the task, and sends its data to the device to forward to the remote server 122. The device node may be selected based on which device node is most likely to complete the task. The tag 102 may prioritize the device nodes based on some cost, such as end user's cell phone costs, platform fees, power usage (a smart phone may connect, send and disconnect more quickly than a repeater allowing the sensor to return to sleep more quickly) and the like. For example, as shown, a tag 102 associated with horse 702A (having Owner A) may select the smart phone 114B carried by Owner B 704B to transmit data to the remote server 122 in the cloud 118.

A tag 102 may detect one or more smart phones 114 and create a detection record of the smart phone which may include one or more of the time of smart phone detection, an identity of the smart phone, a location of the smart phone, or a proximity. The sensor tag 102 may then share the detection record with the remote server 122. The detected smart phones 114 may be associated with accounts other than the user account associated with the sensor tag 102. The remote server 122/application 306 may use this information to update a map of an ad hoc mesh network to display to a user. The remote server 122 may use the identified smart phone and its location to estimate a location of the sensor tag 102.

As the temporary communication platform 750 may result in data from a tag 102 being transmitted by a third party's device node, privacy and security are very important. Tag 102 data may be privacy protected using encryption and authentication methods (e.g. MAC checking, challenge-response etc.) A user may access their data by authenticating their application with the remote server 122. The remote server 122 will only provide data about tags 102 for which the user has the proper credentials. Wireless connections, including that between the tag 102 and the temporary communication platform 750 device modes are protected from common attacks (e.g., MITM, replay) using encryption and authentication methods (e.g., MAC checking, challenge-response, etc.).

In some embodiments, a user may select an option where critical alerts result in a tag 102 and/or the remote server 122 broadcasting an SOS message when a tag 102 identifies an emergency event. In embodiments, the user may elect to have the tag 102 and remote server 122 convey an SOS signal, in the open, to all compatible devices nearby. In an illustrative example, the remote server 122 or tag 102 may alert any nearby users or activate a distress signaling device located on or near the animal. In this case, the need for immediate assistance may temporarily trump privacy.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA")

network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A system for monitoring livestock on a farm, the system comprising:
    a wearable mount adapted to be worn on an animal at a mounting location, the wearable mount comprising a housing and an RFID device within the housing being programmable with identification data of an animal wearing the wearable mount;
    a sensor releasably connectable to the wearable mount, the sensor comprising a memory device and at least one processor, wherein the memory device is programmed to configure the sensor, via the at least one processor, to be associated with the animal wearing the wearable mount based on the identification data of the animal wearing the wearable mount, and wherein the sensor is adapted to generate data regarding a parameter of the animal wearing the wearable mount when the sensor is connected to the wearable mount;
    at least one receiver for receiving the identification data of the animal wearing the wearable mount and the data regarding the parameter of the animal wearing the wearable mount from the sensor; and
    an application for monitoring livestock, in communication with the at least one receiver, the application structured to:
        monitor the data regarding the parameter of the animal wearing the wearable mount;
        predict a condition of the animal wearing the wearable mount based on the data regarding the parameter of the animal wearing the wearable mount using a trained model; and
        configure a parameter of the sensor associated with the animal wearing the wearable mount based at least in part on the predicted condition.

2. The system of claim 1, wherein the parameter is at least one of a measurement interval of the sensor, a frequency between intervals of data transmitted from the sensor, a sensitivity of the sensor, a communications power, or a needed location information fidelity.

3. The system of claim 1, wherein the trained model is trained with a training data set comprising known outcomes and associated behavioral data and health data for a plurality of animals.

4. The system of claim 1, further comprising a mesh network, wherein the at least one receiver is a node of the mesh network.

5. The system of claim 1, wherein the application is further structured to transmit the configured parameter to the sensor.

6. A system for monitoring livestock on a farm, the system comprising:
    a first wearable mount adapted to be worn on a first animal at a first mounting location, the first wearable mount comprising a housing and an RFID device within the housing being programmable with identification data of the first animal;
    a first sensor releasably connectable to the first wearable mount, the first sensor comprising a first memory device and a first processor, wherein the first memory device is programmed to configure the first sensor, via the first processor, to be associated with the first animal based on the identification data of the first animal, and wherein the first sensor is adapted to generate data regarding a parameter of the first animal when the first sensor is connected to the first wearable mount;
    a second wearable mount adapted to be worn on a second animal at a second mounting location, the second wearable mount comprising a housing and an RFID device within the housing being programmable with identification data of the second animal;
    a second sensor releasably connectable to the second wearable mount, the second sensor comprising a second memory device and a second processor, wherein the second memory device is programmed to configure the second sensor, via the second processor, to be associated with the second animal based on the identification data of the second animal, and wherein, the second sensor is adapted to generate data regarding a parameter of the second animal when the second sensor is connected to the second wearable mount;

at least one receiver for receiving the data regarding the parameter of the first animal from the first sensor and the parameter of the second animal from the second sensor; and an application for monitoring livestock, in communication with the at least one receiver, the application structured to:
determine a proximity of the first sensor to the second sensor;
establish a membership of the first animal in a herd based on the determined proximity and at least one of: the data of the parameter of the first animal, or the data of the parameter of the second animal;
monitor the data regarding the parameter of the first animal and the second animal;
predict a condition of the first animal by inputting behavioral data and health data of the first animal and behavioral data and health data of the second animal to a trained model; and
configure a parameter of the first sensor based on the predicted condition, wherein the parameter is at least one of a measurement interval of the first sensor, a frequency between intervals of data transmitted from the first sensor, a sensitivity, a communications power of the first sensor, or a needed location information fidelity.

7. The system of claim 6, wherein the trained model is trained with a training data set comprising known outcomes and associated behavioral data and health data for a plurality of animals.

8. The system of claim 6, further comprising a mesh network, wherein the at least one receiver is a node of the mesh network.

9. The system of claim 6, wherein establishing the membership of the first animal in the herd is further based on a location of the second animal.

10. The system of claim 6, wherein configuring the parameter of the first sensor is further based on a desired power consumption of the first sensor.

11. The system of claim 10, wherein configuring the parameter of the first sensor is further based on at least one of: a predicted battery life of the first sensor, a mesh network performance, or a received signal strength of the first sensor.

12. The system of claim 6, wherein data regarding the parameter of the first animal comprises at least one of a movement of the first animal, a physiological parameter of the first animal, and an animal body function comprising at least one of: a urination, a respiration, a lactation, a bowel movement, a body measurement, a calving activity, or a passing gas.

13. The system of claim 6, wherein data regarding the parameter of the first animal comprises a behavior of an animal related to at least one of a grazing habit, a grazing pattern, a feeding duration, a rumination, a drinking habit, a migration pattern, a sleeping schedule, a lying time, a reproductive activity, a congregation activity, a proximity to the second animal, or a proximity to a stationary device.

14. A system for monitoring livestock on a farm, the system comprising:
a wearable mount adapted to be worn on an animal at a mounting location, the wearable mount comprising a housing and an RFID device within the housing being programmable with identification data of an animal; and
a sensor releasably connectable to the wearable mount, the sensor comprising a memory device and at least one processor, wherein the memory device is programmed to configure the sensor, via the at least one processor, to be associated with the animal based on the identification data of the animal, and wherein the sensor is adapted to generate data regarding a parameter of the animal when the sensor is connected to the wearable mount, wherein the at least one processor is programmed to:
assess a health risk for the animal based on data generated by the sensor; and
generate instructions to modify at least one of a sensing interval of the sensor or a communication interval based on the health risk.

15. The system of claim 14, wherein the sensor generates data indicative of a movement or a physiological parameter of the animal.

16. The system of claim 14, wherein the sensor generates data indicative of an animal body function comprising at least one of: a urination, a respiration, a lactation, a bowel movement, a body measurement, a calving activity, or a passing gas.

17. The system of claim 14, wherein the sensor generates data indicative of a behavior of the animal.

18. The system of claim 17, wherein the behavior is related to at least one of: a grazing habit, a grazing pattern, a feeding duration, a rumination, a drinking habit, a migration pattern, a sleeping schedule, a lying time, a reproductive activity, a congregation activity, or a proximity to another animal or stationary device.

19. The system of claim 17, wherein the at least one processor is further programmed to generate instructions to determine if the health risk has decreased and to decrease the sensing interval if the health risk has decreased.

* * * * *